United States Patent
Zhu et al.

(10) Patent No.: US 12,273,750 B2
(45) Date of Patent: Apr. 8, 2025

(54) METHOD AND APPARATUS FOR MEASURING AND REPORTING COMMUNICATION PARAMETERS

(71) Applicant: Samsung Electronics Co., Ltd., Suwon-si (KR)

(72) Inventors: Dalin Zhu, Richardson, TX (US); Eko Onggosanusi, Coppell, TX (US); Md. Saifur Rahman, Plano, TX (US); Emad N. Farag, Flanders, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 548 days.

(21) Appl. No.: 17/650,821

(22) Filed: Feb. 11, 2022

(65) Prior Publication Data

US 2022/0264342 A1   Aug. 18, 2022

Related U.S. Application Data

(60) Provisional application No. 63/153,089, filed on Feb. 24, 2021, provisional application No. 63/150,391, filed on Feb. 17, 2021.

(51) Int. Cl.
*H04W 24/10* (2009.01)
*H04L 5/00* (2006.01)
*H04W 24/08* (2009.01)

(52) U.S. Cl.
CPC ........... *H04W 24/08* (2013.01); *H04L 5/0048* (2013.01); *H04W 24/10* (2013.01)

(58) Field of Classification Search
CPC ...... H04W 24/08; H04W 24/10; H04L 5/0048
See application file for complete search history.

(56) References Cited

U.S. PATENT DOCUMENTS

2013/0244678 A1   9/2013   Damnjanovic et al.
2013/0308590 A1   11/2013  Ihm et al.
(Continued)

FOREIGN PATENT DOCUMENTS

EP   2804425 B1   6/2020
EP   4287725 A1   12/2023
(Continued)

OTHER PUBLICATIONS

International Search Report and Written Opinion issued May 18, 2022 regarding Application No. PCT/KR2022/002359, 7 pages.
(Continued)

*Primary Examiner* — Kent Krueger

(57) ABSTRACT

Methods and apparatuses for measuring and reporting channel parameters in a distributed antenna wireless communication system. A method for operating a user equipment (UE) includes receiving a configuration for reporting in a channel state information (CSI) report a channel offset for a target entity; measuring one or more measurement reference signals (RSs) for determining the channel offset; determining, based on the measured one or more measurement RSs, the channel offset for the target entity; and transmitting, at least based on the configuration, the CSI report including a channel offset report associated with the determined channel offset. The measurement RSs comprise channel state information reference signals (CSI-RSs), synchronization signal blocks (SSBs), or both CSI-RSs and SSBs.

20 Claims, 19 Drawing Sheets

(56) References Cited

U.S. PATENT DOCUMENTS

| | | | |
|---|---|---|---|
| 2014/0362720 A1 | 12/2014 | Kim et al. | |
| 2019/0281574 A1 | 9/2019 | Reial et al. | |
| 2020/0304174 A1 | 9/2020 | Baligh et al. | |
| 2023/0344600 A1* | 10/2023 | Levitsky | H04L 1/0026 |
| 2024/0214150 A1* | 6/2024 | Xiao | H04B 7/0695 |

FOREIGN PATENT DOCUMENTS

| | | |
|---|---|---|
| WO | 2022164195 A2 | 8/2022 |
| WO | 2022177381 A1 | 8/2022 |

OTHER PUBLICATIONS

"3rd Generation Partnership Project; Technical Specification Group Radio Access Network; NR; Physical channels and modulation (Release 16)", 3GPP TS 38.211 V16.1.0, Mar. 2020, 130 pages.

"3rd Generation Partnership Project; Technical Specification Group Radio Access Network; NR; Multiplexing and channel coding (Release 16)", 3GPP TS 38.212 V16.1.0, Mar. 2020, 146 pages.

"3rd Generation Partnership Project; Technical Specification Group Radio Access Network; NR; Physical layer procedures for control (Release 16)", 3GPP TS 38.213 V16.1.0, Mar. 2020, 156 pages.

"3rd Generation Partnership Project; Technical Specification Group Radio Access Network; NR; Physical layer procedures for data (Release 16)", 3GPP TS 38.214 V16.1.0, Mar. 2020, 151 pages.

"5G; NR; Medium Access Control (MAC) protocol specification (3GPP TS 38.321 version 16.1.0 Release 16)", ETSI TS 138 321 V16.1.0, Jul. 2020, 153 pages.

"5G; NR; Radio Resource Control (RRC); Protocol specification (3GPP TS 38.331 version 16.1.0 Release 16)", ETSI TS 138 331 V16.1.0, Jul. 2020, 886 pages.

Extended European Search Report issued Jun. 10, 2024 regarding Application No. 22756521.5, 14 pages.

* cited by examiner

Estimated phase offsets
$\Delta\hat{p}_1$ for RRH_1, $\Delta\hat{p}_2$ for RRH_2, ..., $\Delta\hat{p}_i$ for RRH_i, ..., $\Delta\hat{p}_{N_{RRH}}$ for RRH_$N_{RRH}$

Selected candidate phase offsets
$\Delta\hat{q}_1$ for RRH_1, $\Delta\hat{q}_2$ for RRH_2, ..., $\Delta\hat{q}_i$ for RRH_i, ..., $\Delta\hat{q}_{N_{RRH}}$ for RRH_$N_{RRH}$

Codebook for frequency offset
$$U = \{u_1, u_2, ..., u_K\}$$

METHOD AND APPARATUS FOR MEASURING AND REPORTING COMMUNICATION PARAMETERS

CROSS-REFERENCE TO RELATED APPLICATIONS AND CLAIM OF PRIORITY

The present application claims priority to U.S. Provisional Patent Application No. 63/150,391, filed on Feb. 17, 2021, and U.S. Provisional Patent Application No. 63/153,089, filed on Feb. 24, 2021. The content of the above-identified patent document is incorporated herein by reference.

TECHNICAL FIELD

The present disclosure relates generally to wireless communication systems and, more specifically, the present disclosure relates to measuring and reporting channel parameters in a distributed antenna wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to measuring and reporting channel parameters in a distributed antenna wireless communication system.

In one embodiment, a user equipment (UE) is provided. The UE includes a transceiver configured to receive a configuration for reporting in a channel state information (CSI) report a channel offset for a target entity. The UE further includes a processor operably coupled to the transceiver. The processor is configured to measure one or more measurement reference signals (RSs) for determining the channel offset and determine, based on the measured one or more measurement RSs, the channel offset for the target entity. The transceiver is further configured to transmit, at least based on the configuration, the CSI report including a channel offset report associated with the determined channel offset. The measurement RSs comprise channel state information reference signals (CSI-RSs), synchronization signal blocks (SSBs), or both CSI-RSs and SSBs.

In another embodiment, a base station (BS) is provided. The BS includes a processor configured to generate a configuration for reporting in a CSI report a channel offset for a target entity. The BS further includes a transceiver operably coupled to the processor. The transceiver is configured to transmit the configuration; transmit one or more measurement RSs; and receive, at least based on the configuration, the CSI report including a channel offset report associated with the channel offset for the target entity. The channel offset is based on the one or more measurement RSs. The measurement RSs comprise CSI-RSs, SSBs, or both CSI-RSs and SSBs.

In yet another embodiment, a method for operating a UE is provided. The method includes receiving a configuration for reporting in a CSI report a channel offset for a target entity; measuring one or more measurement RSs for determining the channel offset; determining, based on the measured one or more measurement RSs, the channel offset for the target entity; and transmitting, at least based on the configuration, the CSI report including a channel offset report associated with the determined channel offset. The measurement RSs comprise CSI-RSs, SSBs, or both CSI-RSs and SSBs.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.1.0, "NR; Physical channels and modulation"; 3GPP TS 38.212 v16.1.0, "NR; Multiplexing and Channel coding"; 3GPP TS 38.213 v16.1.0, "NR; Physical Layer Procedures for Control"; 3GPP TS 38.214 v16.1.0, "NR; Physical Layer Procedures for Data"; 3GPP TS 38.321 v16.1.0, "NR; Medium Access Control (MAC) protocol specification"; and 3GPP TS 38.331 v16.1.0, "NR; Radio Resource Control (RRC) Protocol Specification."

Figure 1:
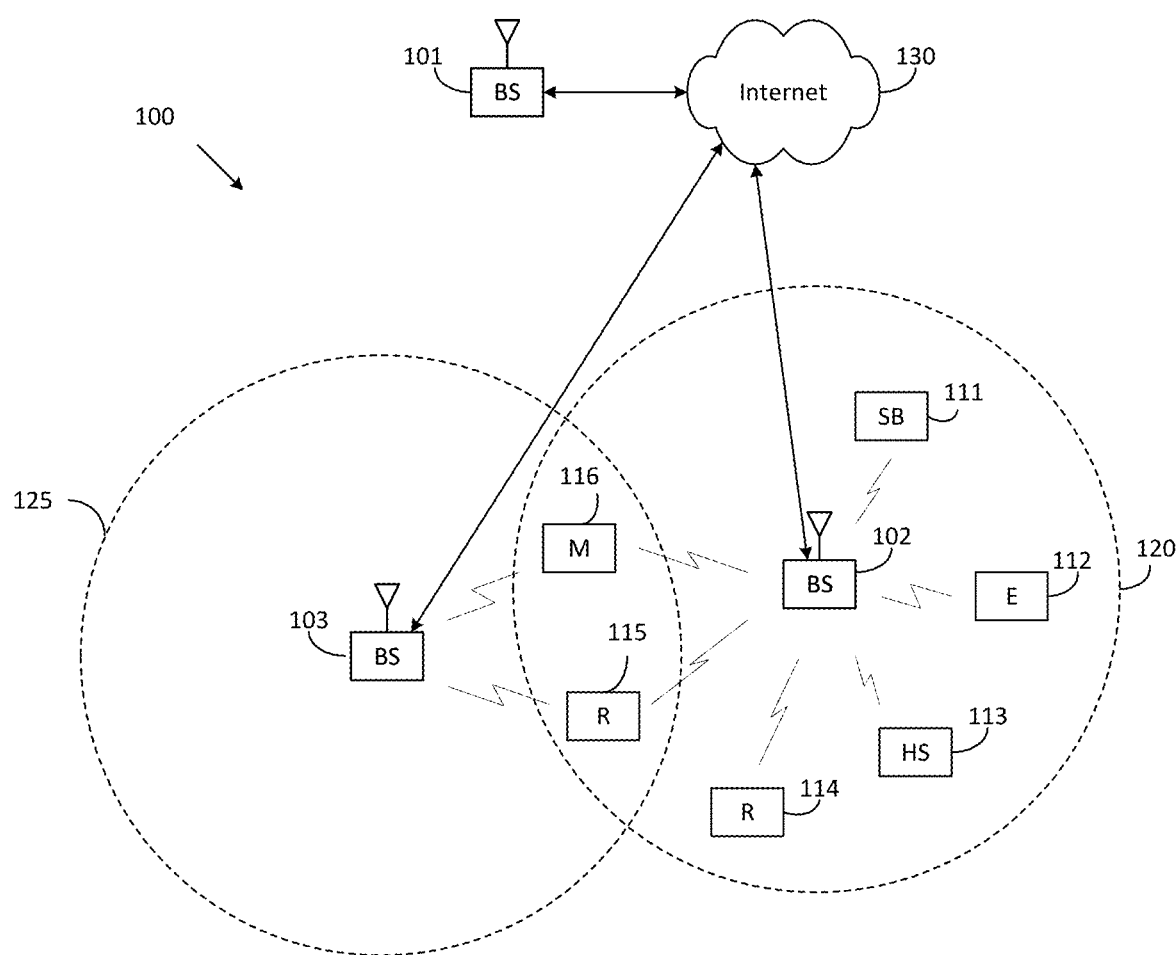
FIG. 1 illustrates an example of wireless network according to embodiments of the present disclosure.
Figure 2:
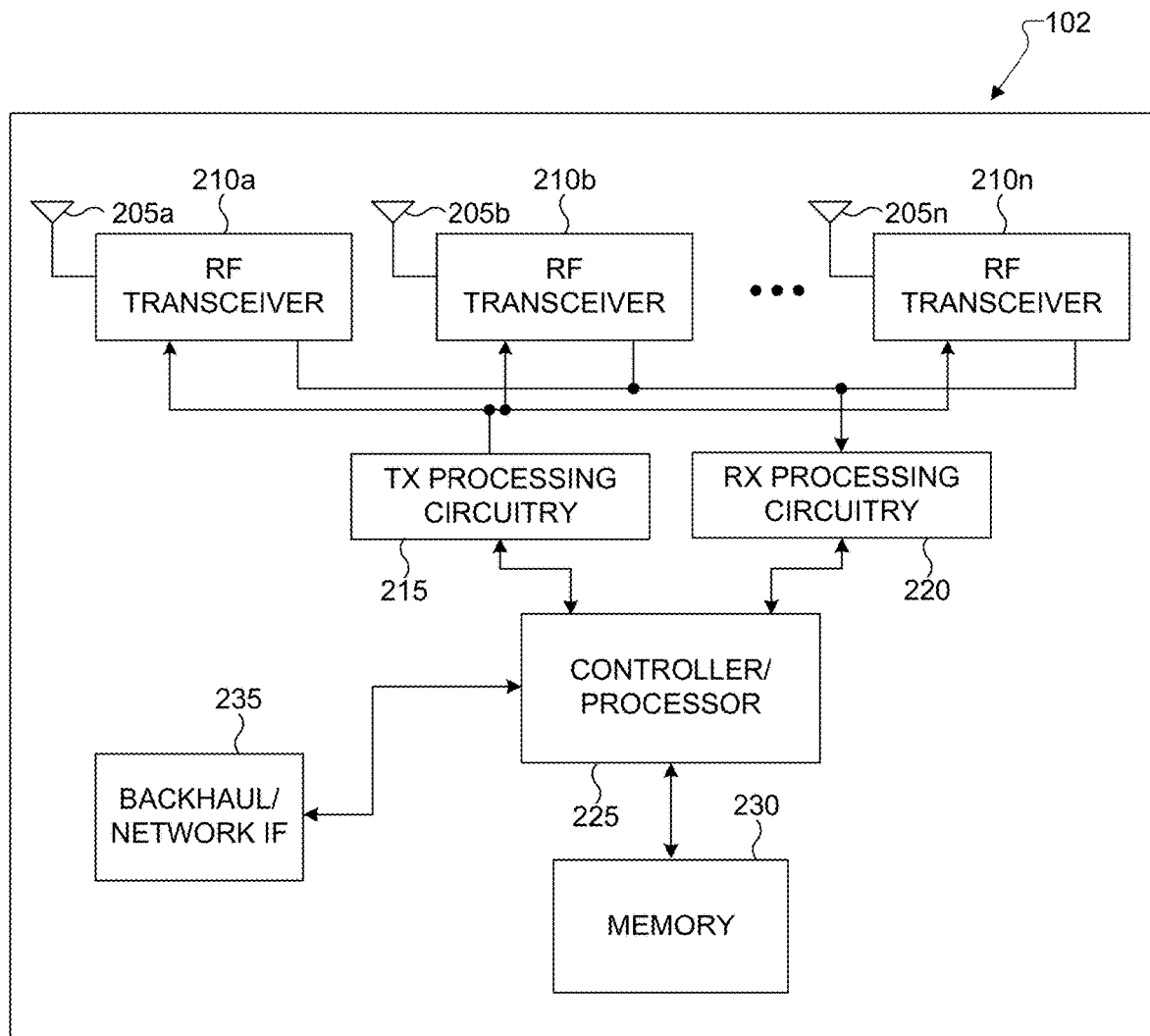
FIG. 2 illustrates an example of gNB according to embodiments of the present disclosure.
Figure 3:
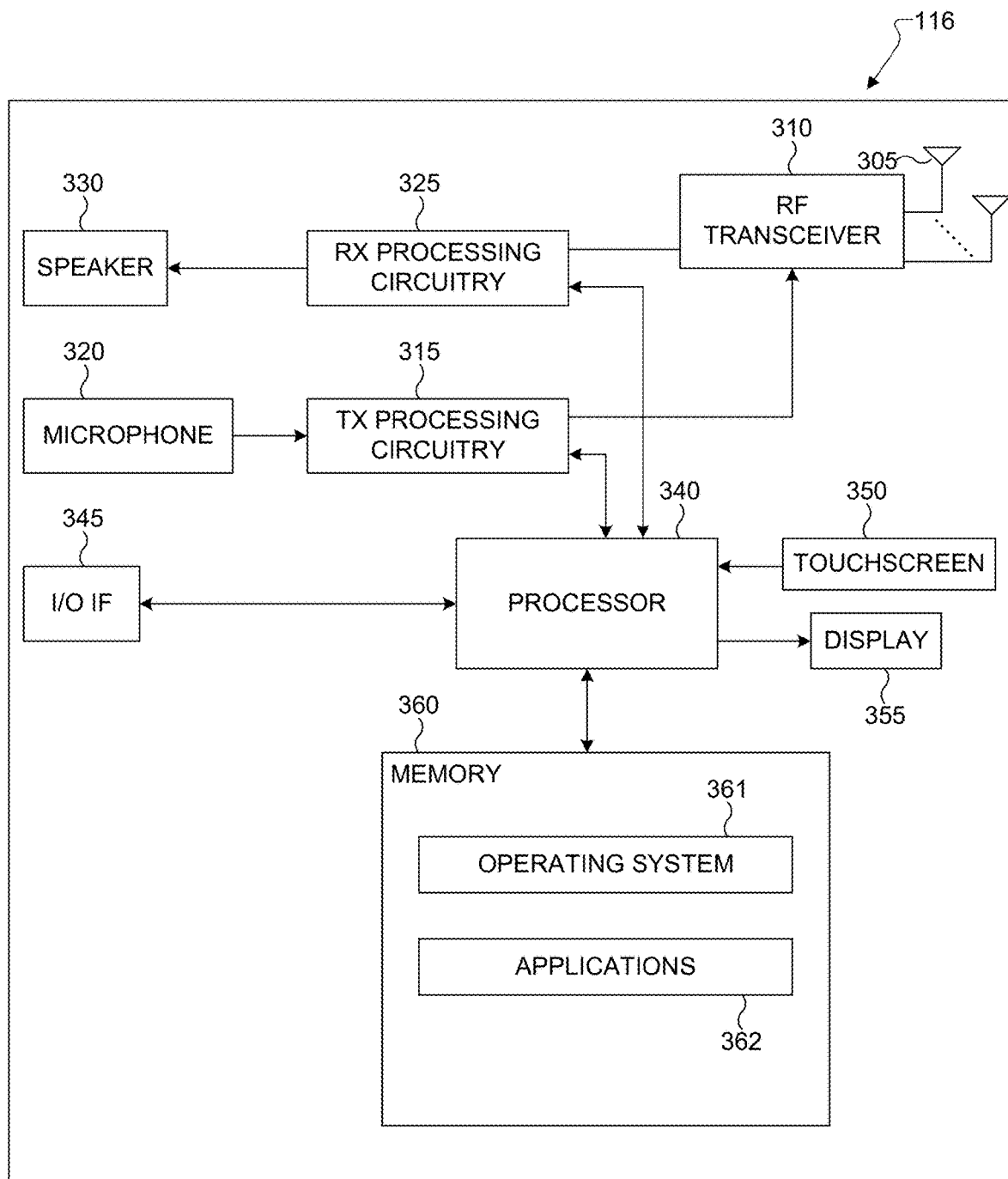
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for communications parameters measurement and reporting in a wireless communication system. In certain embodiments, and one or more of the gNBs 101-103 includes circuitry, programing, or a combination thereof, for communications parameters measurement and reporting in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of downlink (DL) channel signals and the transmission of uplink (UL) channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support communications parameters measurement and reporting in a wireless communication system. Another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of DL signals and the transmission of UL channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for communications parameters measurement and reporting in a wireless communication system. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
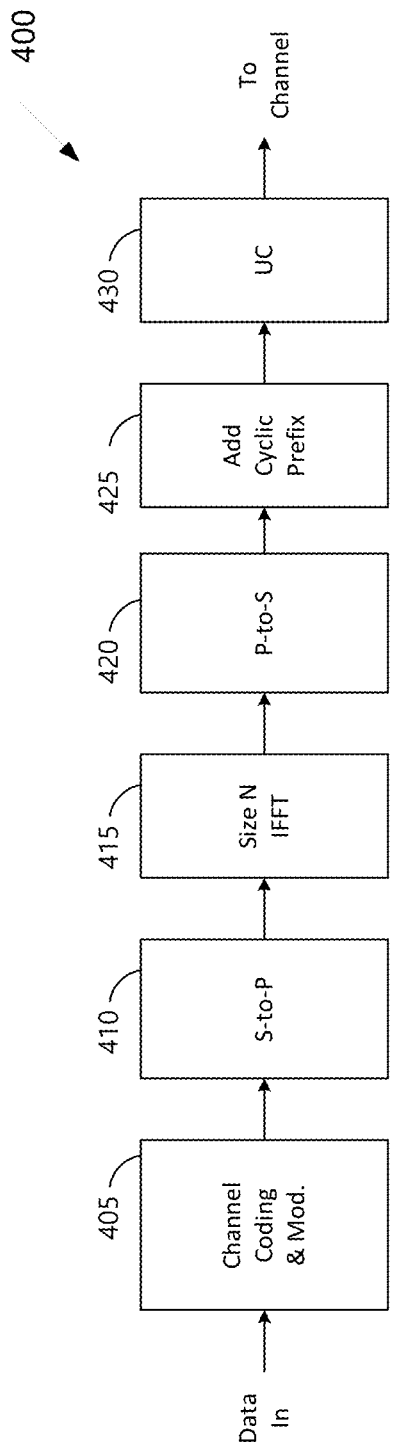
FIGS. 4 and 5 illustrate example of wireless transmit and receive paths according to this disclosure.
Figure 5:
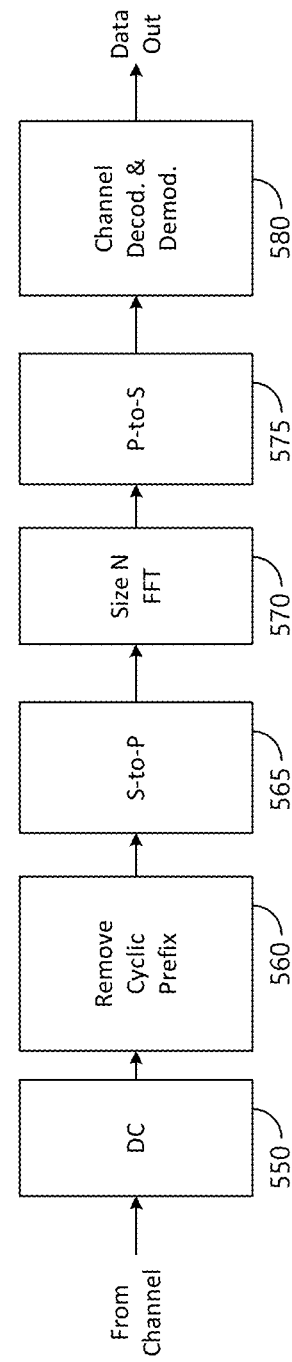

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In a wireless communications system, a UE could communicate with a large number of remote radio heads (RRHs), distributed within a certain area. Each RRH could be equipped with an antenna array having a certain number of antenna elements. One or more RRHs could be connected through a single baseband processing unit such that signals received at different RRHs could be processed in a centralized manner.

Figure 6:
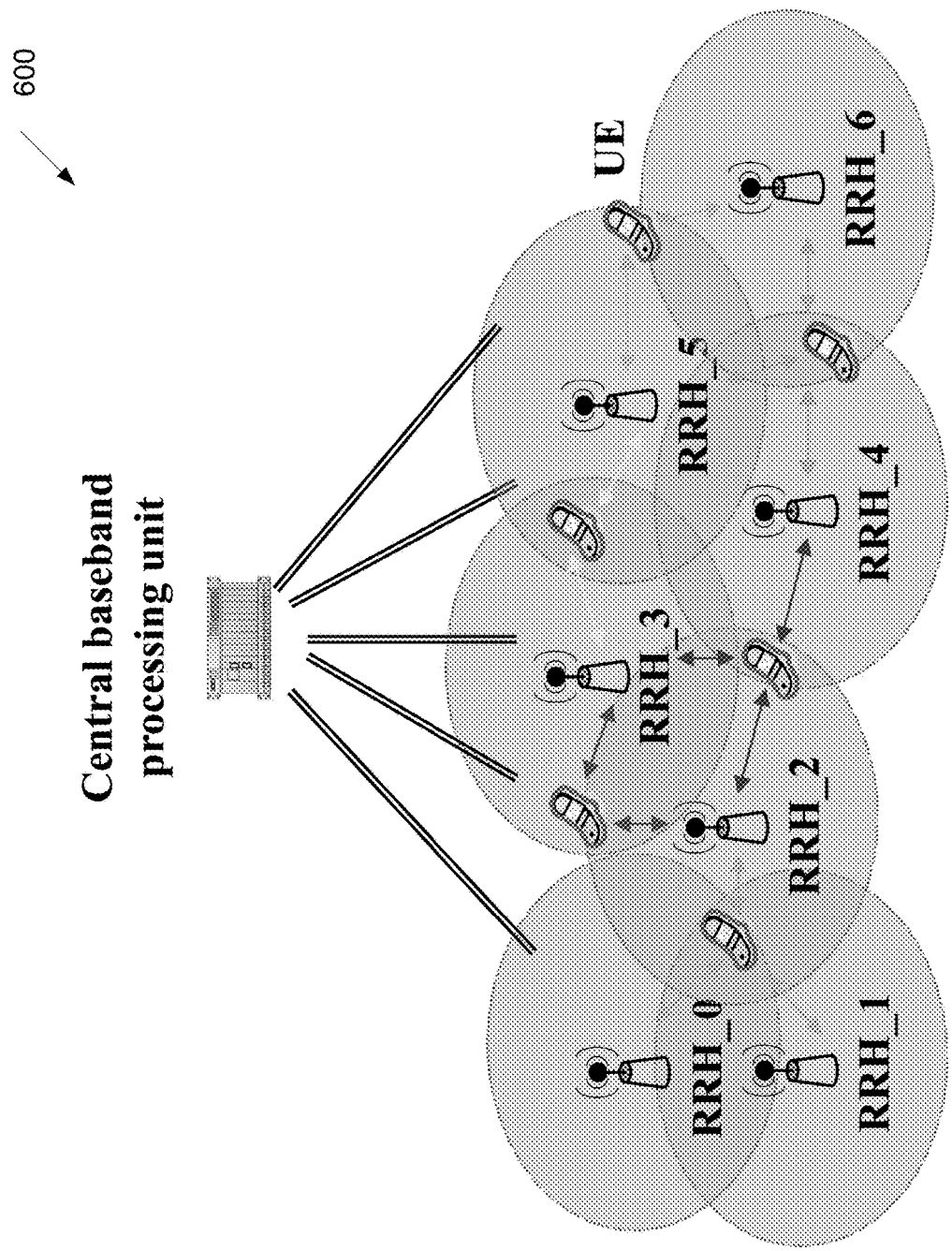
FIG. 6 illustrate an example of wireless communications system comprising distributed RRHs according to embodiments of the present disclosure.

FIG. 6 illustrate an example of wireless communications system comprising distributed RRHs 600 according to embodiments of the present disclosure. An embodiment of the wireless communications system comprising distributed RRHs 600 shown in FIG. 6 is for illustration only.

In a wireless communications system, a UE could communicate with a large number of remote radio heads (RRHs), distributed within a certain area. Each RRH could be equipped with an antenna array having a certain number of antenna elements. One or more RRHs could be connected through a single baseband processing unit such that signals transmitted from or received at different RRHs could be processed in a centralized manner. A wireless communications system comprising of 7 distributed RRHs is depicted in FIG. 6. As can be seen from FIG. 6, the seven distributed RRHs are connected through a central baseband processing unit. Further, a UE could communicate with multiple RRHs in both downlink and uplink directions. For instance, the UE on the far right in FIG. 6 could transmit/receive to/from RRH_5 and RRH_6. Here, RRH_5 and RRH_6 could be regarded as a RRH cluster for the UE. For another example, the UE on the far left in FIG. 6 could transmit/receive to/from three RRHs, RRH_0, RRH_1 and RRH_2, in both downlink and uplink directions, and RRH_0, RRH_1 and RRH_2 could be regarded as the RRH cluster for this UE.

Different RRHs (or distributed arrays) in the RRH cluster for the UE could have significantly different frequency offsets (phase shifts), array phase offsets and amplitude offsets, and their transmitted signals to the UE could experience significantly different propagation delays (including multi-path timing/delay components such as average delay and delay spread) and Doppler shifts. These differences could vary over time and independently between/for different RRHs because different RRHs could be geographically separated/non-co-located. To better support distributed multiple-input multiple-output (MIMO) operation in a distributed RRH system, the network needs to calibrate the differences (e.g., in terms of the frequency offset (phase shift), array phase and amplitude offsets, Doppler shift, propagation delay, average delay, delay spread and etc.) between/for different RRHs in the RRH cluster for the UE.

The present disclosure considers several design issues for the distributed RRH system, wherein a UE could communicate with multiple RRHs in both DL and UL directions. A variety of RRH clustering mechanisms are first developed, and their associated configuration/indication methods are specified. Further, several UE reporting assisted distributed arrays/RRHs calibration methods are developed for the distributed RRH system. The associated configuration/indication methods are also discussed.

There are various means to configure a RRH cluster for a given UE in a distributed RRH system.

In one embodiment of Option-1, the UE could be configured by the network to measure one or more reference signals (RSs) for RRH clustering from one or more RRHs. The UE could then report to the network the corresponding measurement results, upon which the network could determine the RRH cluster for the UE of interest. The measurement results could be based on L1-RSRP, L1-SINR and/or other L1 metrics. The UE could be configured/indicated by the network the RRH clustering results, which could comprise of the corresponding RRH IDs/indices, a primary RRH ID/index, and etc. Under certain settings, the RRH clustering results are transparent to the UE, i.e., the RRH clustering results are not indicated to the UE from the network.

In one example, to facilitate measuring the RSs for RRH clustering from different RRHs and reporting the measurement results, the RSs for RRH clustering from different RRHs could be multiplexed in time, frequency, spatial and/or code domains. For instance, the UE could be configured by the network to measure the RSs for RRH clustering from different RRHs in different symbols/slots/etc. For another example, the UE could be configured by the network to measure the RSs for RRH clustering from different RRHs in different resource blocks. The UE could also be indicated by the network the association rule(s)/mapping relationship(s) between the RRH IDs/indices and the RSs for RRH clustering. In this case, the UE could know which RRH(s) the corresponding RSs for RRH clustering are transmitted from.

In one example, to facilitate measuring the RSs for RRH clustering from different RRHs and reporting the measurement results, the UE could be configured by the network to report the measurement results through certain time, frequency, spatial and/or code domain resources. For instance, the UE could be configured by the network to report the measurement results for different RRHs through different symbols/slots/etc. For another example, the UE could be configured by the network to report the measurement results for different RRHs through different resource blocks. The UE could be indicated by the network the association rule(s)/mapping relationship(s) between the RSs for RRH clustering and the reports and/or between the RRH IDs/indices and the reports. Alternatively, the UE could autonomously determine the association rule(s)/mapping relationship(s) between the RSs for RRH clustering (or the RRH IDs/indices) and the reports, and indicate to the network the association rule(s)/mapping relationship(s).

In one embodiment of Option-2, the UE could autonomously determine their RRH cluster based on the measurement results of the DL RSs for RRH clustering from different RRHs. The UE could indicate to the network the RRH clustering results, which could comprise of the corresponding RRH IDs/indices, a primary RRH ID/index, and etc. In this case, the UE needs to be indicated by the network the association rule(s)/mapping relationship(s) between the RRH IDs/indices and the RSs for RRH clustering. Alternatively, if the UE anyways needs to report to the network the measurement results, the UE could indicate to the network the association(s) between different reports such that the RRHs corresponding to the associated reports are regarded as the RRH cluster for the UE. This requires the UE and the network to have a common understanding of how the RRH IDs/indices and the reports are associated/mapped.

For instance, the UE could be indicated by the network the association rule(s)/mapping relationship(s) between the RRH IDs/indices and the reports. For another example, the UE could autonomously determine the association rule(s)/mapping relationship(s) between the RRH IDs/indices and the reports, and indicate to the network the association rule(s)/mapping relationship(s). The UE could be configured by the network through higher layer RRC signaling whether the UE could autonomously determine their RRH cluster and/or indicate to the network the RRH clustering results. The UE could also send a status report to the network indicating whether the UE has autonomously determined their RRH cluster.

In one embodiment of Option-3, the UE could transmit certain preambles such as sounding reference signals (SRSs) to the RRHs to assist RRH clustering. Based on the measurements of the UL preambles for RRH clustering, the network could determine the RRH cluster for the UE of interest. The UE could be then be configured/indicated by the network via higher layer RRC signaling the RRH clustering results, which could comprise of the corresponding RRH IDs/indices, a primary RRH ID/index, and etc.

The UE could be indicated/configured by the network via higher layer RRC signaling which option from Option-1, Option-2, and Option-3 to follow for configuring/determining the RRH cluster.

Due to channel variations, the RRH cluster for a UE could vary over time. For Option-1 and Option-2, the UE could be configured by the network to periodically measure the DL RSs for RRH clustering and/or report to the network the measurement results. The UE could also be requested/triggered by the network to measure the DL RSs for RRH clustering and/or report to the network the corresponding measurement results in an aperiodic manner. For Option-3, the UE could be configured by the network to periodically transmit to the network the UL preambles for RRH clustering.

Alternatively, the UE could be requested/triggered by the network to transmit the UL preambles for RRH clustering in an aperiodic manner. For Option-1, Option-2, and Option-3, the UE could indicate to the network that a new RRH cluster is needed so that the network could configure (additional) DL RSs for RRH clustering for the UE to measure and report and/or the UE to transmit (additional) UL preambles for RRH clustering. Further, the UE could be configured by the network two timers (a first timer and a second timer). The UE could reset both timers if a new RRH cluster is configured and applied for the UE. The UE would not apply another new RRH cluster before the first timer expires. If the second timer expires, the UE would indicate to the network that a new RRH cluster is needed.

In one embodiment, a UE reporting assisted frequency calibration method for a distributed RRH system is presented.

Figure 7:
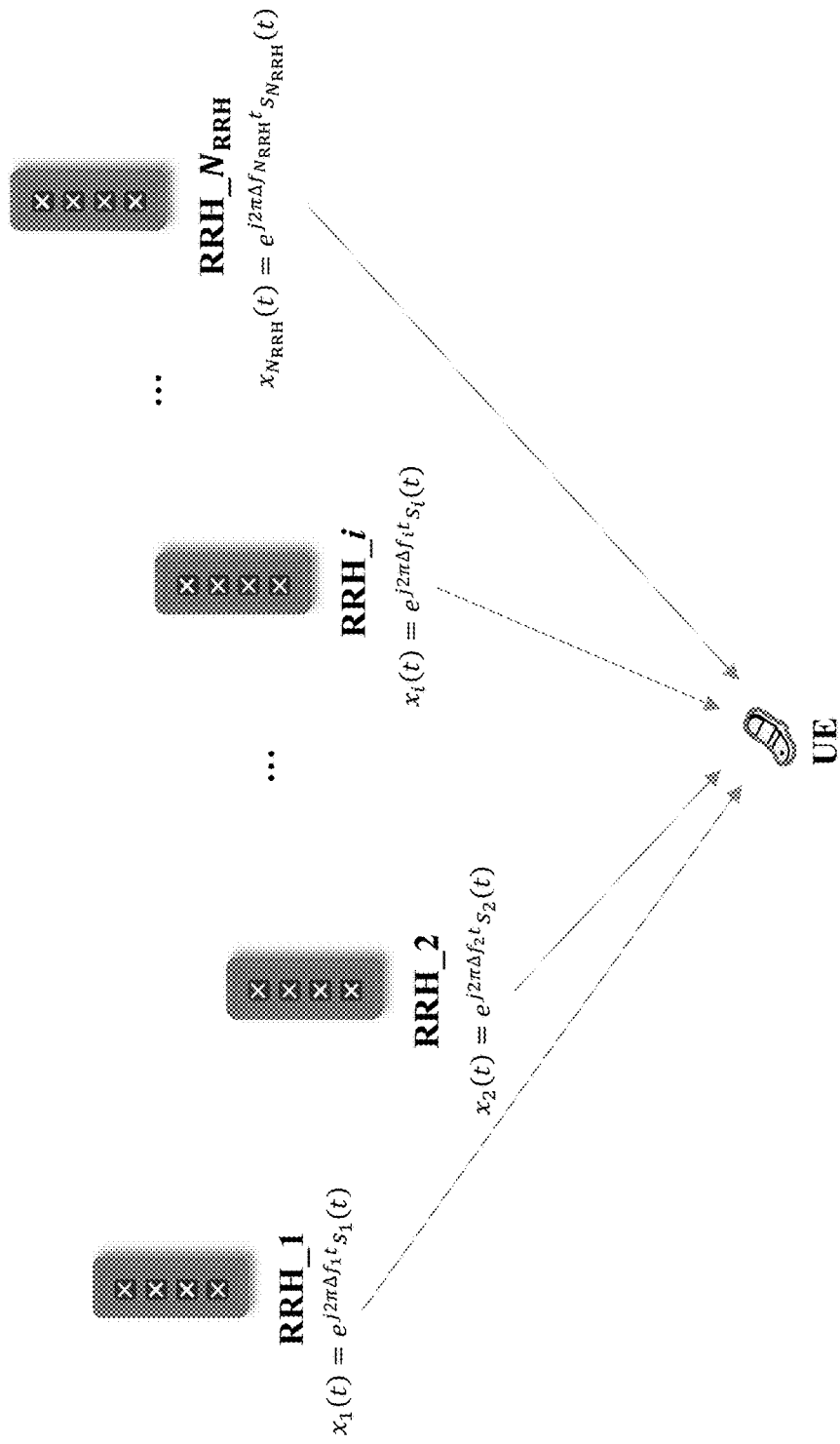
FIG. 7 illustrate an example of RRH-specific frequency offsets in a distributed RRH system according to embodiments of the present disclosure.

FIG. 7 illustrate an example of RRH-specific frequency offsets 700 in a distributed RRH system according to embodiments of the present disclosure. An embodiment of the RRH-specific frequency offsets 700 shown in FIG. 7 is for illustration only.

As different RRHs could be geographically separated/non-co-located and have independent radio frequency (RF) components, the different RRHs could have different carrier frequency offsets with respect to a reference carrier frequency $f_0$. In FIG. 7, a conceptual example of frequency offset differences between different RRHs in the RRH cluster for the UE is depicted. As can be seen from FIG. 7, the i-th RRH in the RRH cluster for the UE could result in a frequency offset $\Delta f_i$ (i=1, 2, . . . , $N_{RRH}$). Hence, its transmitted time-domain signal can be expressed as: $x_i(t) = e^{j2\pi \Delta f_i t} s_i(t)$, where $s_i(t)$ is the time-domain signal transmitted from the i-th RRH. As can be seen from the above equation, the transmitted continuous-time signal $s_i(t)$ may be rotated by a constant frequency, which translates to a constant phase shift to the frequency domain signal. Hence, in this disclosure, the provided frequency offset measurement/reporting for network side frequency synchronization/calibration is equivalent to phase shift measurement/reporting for network side phase synchronization/calibration.

If the UE could be indicated/configured by the network the reference carrier frequency $f_0$, the UE could estimate the frequency offset for each RRH in the RRH cluster. The UE could also estimate the actual frequency for each RRH in the RRH cluster regardless of whether the UE knows the reference frequency. Hence, assuming that the UE is indicated/configured by the network the reference carrier frequency, the UE could measure (i) the frequency offset for each RRH in the RRH cluster, (ii) the frequency for each RRH in the RRH cluster, and (iii) the frequency offsets for one or more RRHs in the RRH cluster and the frequencies for one or more RRHs in the RRH cluster (a hybrid of (i) and (ii)). The UE could be indicated/configured by the network one or more of the frequency measurement metrics (e.g., from (i), (ii), and (iii)).

Alternatively, the UE could autonomously determine the frequency measurement metric(s). In this case, the UE could indicate to the network their selected frequency measurement metric(s). In this disclosure, the frequency offset in (i) is regarded as the frequency measurement metric to explain and discuss the UE reporting assisted network side frequency synchronization. The provided solutions can be equally applied to other frequency measurement metrics such as those in (ii) and (iii) as well. Note that the UE could autonomously determine the reference frequency for computing the frequency offset(s). In this case, the UE could indicate to the network their determined reference frequency value(s).

The UE could estimate the frequency offset(s) by measuring certain DL RSs (such as CSI-RSs, TRSs, and etc.) transmitted from one or more RRHs in the RRH cluster and report to the network their estimated frequency offset(s). Alternatively, the UE could transmit uplink sounding signals to one or more RRHs in the RRH cluster for the purpose of frequency synchronization/calibration. In the following, several design options of UE reporting assisted frequency (offset) calibration at the network side are presented.

The UE could be first configured/indicated by the network to measure one or more RSs (such as CSI-RSs, TRSs, and etc.) for frequency offset estimation/tracking from each RRH (RRH-specific RSs for frequency offset estimation/tracking). The UE could then be configured/indicated by the network to report to the network the corresponding measurement results from measuring the RRH-specific RSs for frequency offset estimation/tracking. Here, the measurement results could correspond to the estimated frequency offsets for each RRH in the RRH cluster for the UE.

The RRH-specific RSs for frequency offset estimation/tracking from different RRHs could be multiplexed in time, frequency, spatial and/or code domains. For instance, the UE could be configured by the network to measure the RRH-specific RSs for frequency offset estimation/tracking from different RRHs in different symbols/slots/etc. For another example, the UE could be configured by the network to measure the RRH-specific RSs for frequency offset estimation/tracking from different RRHs in different resource blocks. The UE could also be indicated by the network the association rule(s)/mapping relationship(s) between the RRH IDs/indices and the RRH-specific RSs for frequency offset estimation/tracking. In this case, the UE could know which RRH(s) the corresponding RSs for frequency offset estimation/tracking are transmitted from.

The UE could be configured by the network to report the measurement results through certain time, frequency, spatial and/or code domain resources. For instance, the UE could be configured by the network to report the measurement results for different RRHs through different symbols/slots/etc. For another example, the UE could be configured by the network to report the measurement results for different RRHs through different resource blocks. The UE could be indicated by the network the association rule(s)/mapping relationship(s) between the RRH-specific RSs for frequency offset estimation/tracking and the reports and/or between the RRH IDs/indices and the reports. Alternatively, the UE could autonomously determine the association rule(s)/mapping relationship(s) between the RRH-specific RSs for frequency offset estimation/tracking (or the RRH IDs/indices) and the reports, and indicate to the network the association rule(s)/mapping relationship(s).

Figure 8:
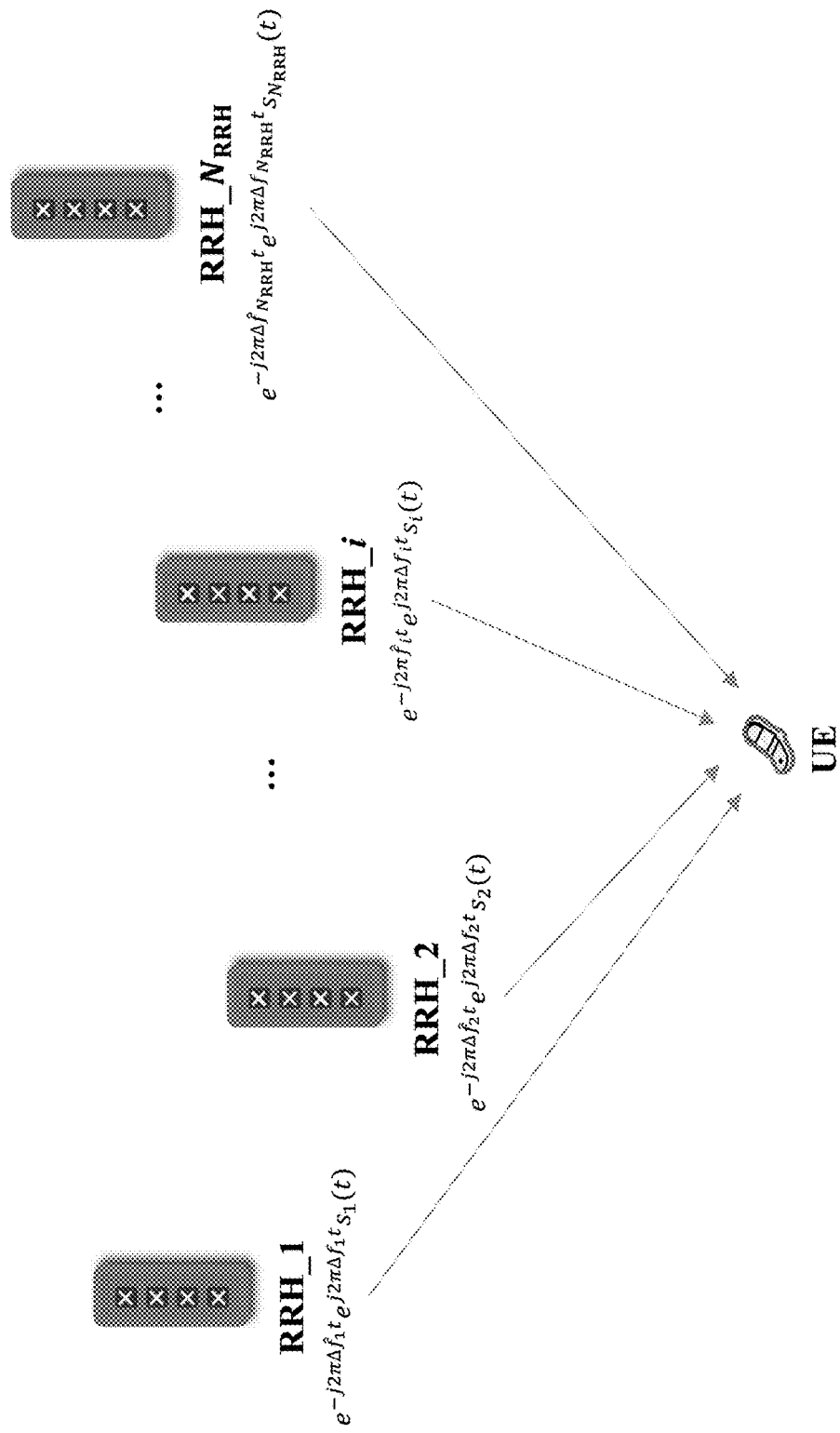
FIG. 8 illustrates an example of applying RRH-specific frequency calibration in a distributed RRH system according to embodiments of the present disclosure.

FIG. 8 illustrates an example of applying RRH-specific frequency calibration 800 in a distributed RRH system according to embodiments of the present disclosure. An embodiment of applying the RRH-specific frequency calibration 800 shown in FIG. 8 is for illustration only.

Denote the exact value of the estimated frequency offset for RRH_i by $\Delta \hat{f}_i$. Note that the notion of $\Delta \hat{f}_i$ is for illustrative purpose. The unit for the frequency offset could be kHz, Hz, parts per million (ppm) and etc., and the estimated frequency offset could be scaled by a known factor, such as the carrier frequency, prior to reported to the network. Upon receiving the frequency offset estimates from the UE, the network could calibrate the frequencies for different RRHs in the RRH cluster for the UE (see FIG. 8).

In one embodiment of Option-1.1, the UE could report to the network the exact values of their estimated frequency offsets for each RRH in the RRH cluster through the designated resource(s) for the corresponding RRH. The UE could also report to the network the RRH ID along with the report of the estimated frequency offset for the RRH.

Figure 9:
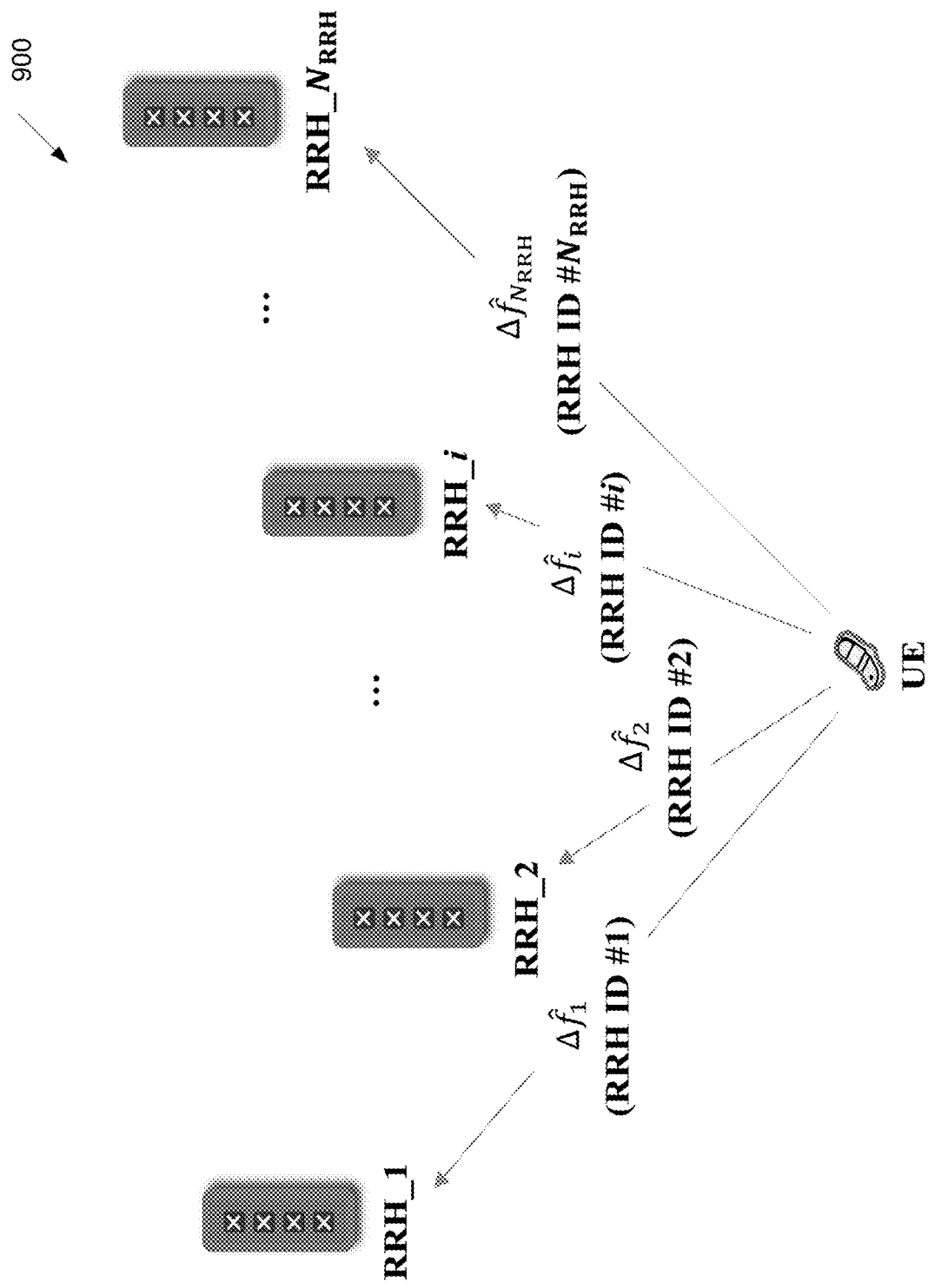
FIG. 9 illustrates an example of UE reporting RRH-specific frequency offset estimates according to embodiments of the present disclosure.

FIG. 9 illustrates an example of UE reporting RRH-specific frequency offset estimates 900 according to embodiments of the present disclosure. An embodiment of the UE reporting the RRH-specific frequency offset estimates 900 shown in FIG. 9 is for illustration only.

In FIG. 9, a conceptual example charactering separately reporting the estimated frequency offset values for each RRH in the RRH cluster is presented. Upon receiving the estimated frequency offset(s) reported from the UE, the network could calibrate the carrier frequency value(s) for each RRH in the RRH cluster for the UE by compensating for the corresponding estimated frequency offset value(s).

In one embodiment of Option-1.2, the UE could first scale the estimated frequency offset(s) by a known factor. For instance, the UE could normalize the estimated frequency offset for RRH_i by the carrier frequency $f_0$, and obtain the scaled version as $\Delta \hat{f}_i/f_0$. The UE could then report to the network the scaled versions of their estimated frequency offsets for each RRH in the RRH cluster through the designated resource(s) for the corresponding RRH. Similar to Option-1.1, the UE could report to the network the RRH ID along with the report of the scaled estimated frequency offset for the RRH. Under certain settings, the UE may need to indicate to the network the applied scaling factor. Whether to report the exact or scaled frequency offset estimate(s) could be predefined/preconfigured, and known to both the network and the UE. Alternatively, the UE could be configured/indicated by the network whether to report the exact or scaled values of the estimated frequency offset(s). Further, the UE could indicate to the network whether the reported frequency offset estimates are the exact values or scaled by the known scaling factor.

Figure 10:
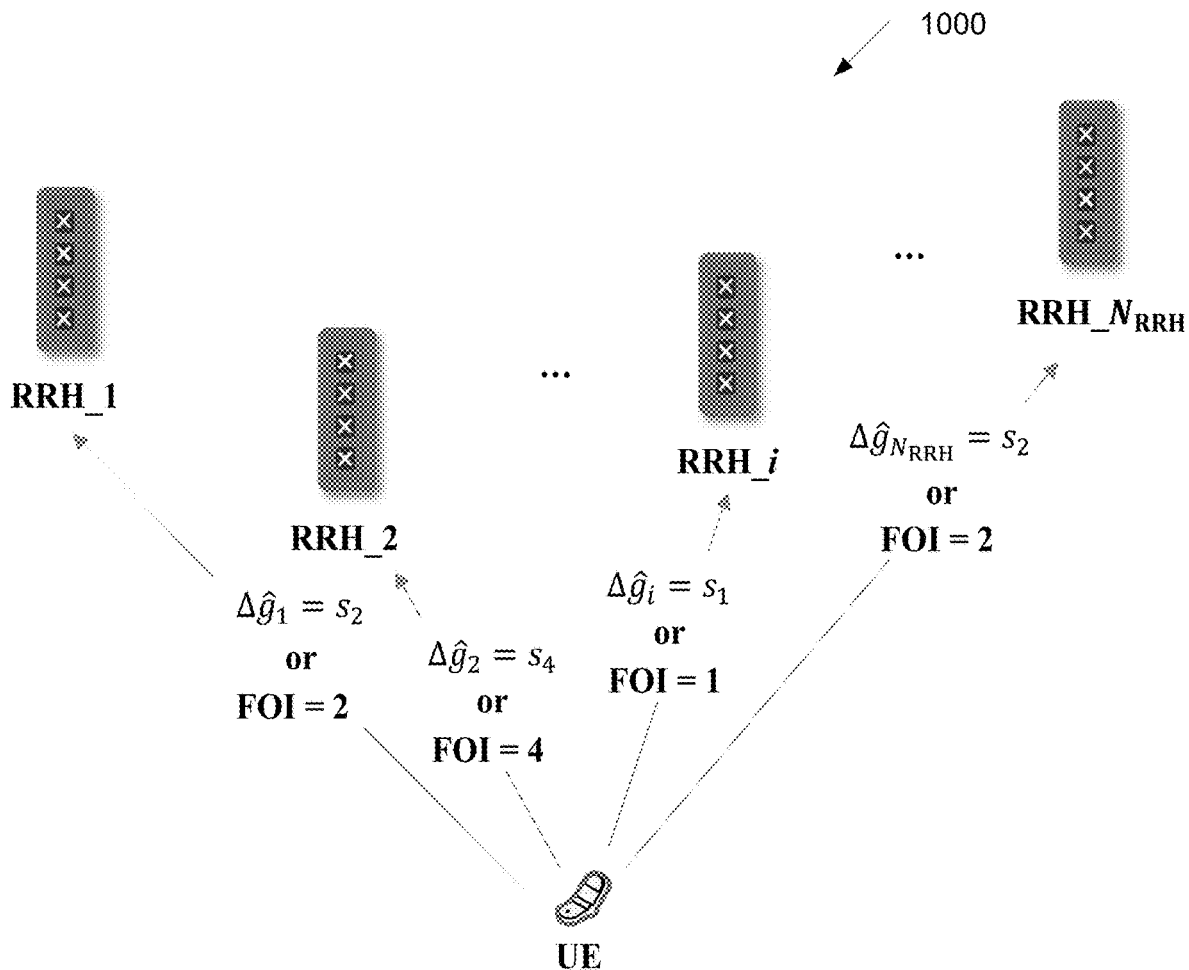
FIG. 10 illustrates an example of UE reporting RRH-specific quantized frequency offset estimates according to embodiments of the present disclosure.

FIG. 10 illustrates an example of UE reporting RRH-specific quantized frequency offset estimates 1000 according to embodiments of the present disclosure. An embodiment of the UE reporting the RRH-specific quantized frequency offset estimates 1000 shown in FIG. 10 is for illustration only.

In one embodiment of Option-1.3, the UE could be configured by the network a set of candidate values of frequency offset (codebook for frequency offset), denoted by $S=\{s_1, s_2, \ldots, s_Q\}$. For a given estimated frequency offset for RRH_i ($\Delta \hat{f}_i$), the UE could select one candidate frequency offset value from the set/codebook of candidate frequency offset values that best characterizes the estimated frequency offset. For instance, the selected candidate frequency offset value for RRH_i (denoted by $\Delta \hat{g}_i$ could have the smallest/least Euclidean distance with the actual estimated frequency offset for RRH_i ($\Delta \hat{f}_i$) than the other candidate frequency offset values in the set/codebook of all candidate frequency offset values. The UE could report to the network the selected candidate frequency offset values for each RRH in the RRH cluster.

Alternatively, the UE could report to the network the indices of the selected candidate frequency offsets for each RRH in the RRH cluster in the set/codebook of all candidate frequency offset values (denoted by frequency offset indices (FOIs)). One conceptual example describing reporting the selected candidate frequency offset values or their indices in the codebook for frequency offset is presented in FIG. 10 for a RRH cluster comprising of $N_{RRH}$ RRHs. The UE could report to the network the selected candidate frequency offset value or its index in the codebook for frequency offset through the designated resource(s) for the corresponding RRH. The UE could also report to the network the RRH ID along with the report of the selected candidate frequency offset value or its index in the codebook for frequency offset for the corresponding RRH.

In one embodiment of Option-1.4, the UE could first scale the estimated frequency offset(s) by a known factor. For instance, the UE could normalize the estimated frequency offset for RRH_i by the carrier frequency $f_0$, and obtain the scaled version as $\Delta \hat{f}_i/f_0$. The UE could be configured by the network a set of candidate values of scaled frequency offset (codebook for scaled frequency offset). For a given scaled frequency offset estimate, the UE could select one candidate scaled frequency offset value from the set/codebook of candidate scaled frequency offset values that best characterizes the scaled frequency offset estimate.

For instance, the selected candidate scaled frequency offset value could have the smallest/least Euclidean distance with the actual scaled frequency offset estimate than the other candidate scaled frequency offset values in the set/codebook of all candidates scaled frequency offset values. The UE could report to the network the selected candidate scaled frequency offset values for each RRH in the RRH cluster.

Alternatively, the UE could report to the network the indices of the selected candidate scaled frequency offsets for each RRH in the RRH cluster in the set/codebook of all candidates scaled frequency offset values. Under certain settings, the UE may need to indicate to the network the applied scaling factor. The UE could report to the network the selected candidate scaled frequency offset value or its index in the codebook for scaled frequency offset through the designated resource(s) for the corresponding RRH. The UE could also report to the network the RRH ID along with the report of the selected candidate scaled frequency offset value or its index in the codebook for scaled frequency offset for the corresponding RRH.

In one embodiment of Option-1.5, the UE could report to the network a vector of estimated frequency offsets, with each entry in the vector corresponding to a RRH in the RRH cluster. For instance, for a RRH cluster comprising of $N_{RRH}$ RRHs, the UE could form the vector of frequency offset estimates as $\Delta f=[\Delta \hat{f}_1, \Delta \hat{f}_2, \ldots, \Delta \hat{f}_i, \ldots, \Delta \hat{f}_{N_{RRH}}]$, where $\Delta \hat{f}_i$ corresponds to the i-th RRH in the RRH cluster (RRH_i).

The association rule(s)/mapping relationship(s) between the entries in the vector of frequency offset estimates and the RRHs in the RRH cluster could be predefined, and known to both the network and the UE.

For example, the first entry in the vector corresponds to the RRH with the lowest RRH ID (or the first RRH in the list of RRHs configured to the UE), the second entry in the vector corresponds to the RRH with the second lowest RRH ID (or the second RRH in the list of RRHs configured to the UE), and so on, and the last entry in the vector corresponds to the RRH with the highest RRH ID (or the last RRH in the list of RRHs configured to the UE). Note that other association rule(s)/mapping relationship(s) between the entries in the vector of frequency offset estimates and the RRHs in the RRH cluster are also possible.

Alternatively, the UE could be indicated by the network the explicit association rule(s)/mapping relationship(s) between the entries in the vector of frequency offset estimates and the RRHs in the RRH cluster. Further, the UE could autonomously determine how the entries in the vector of frequency offset estimates would map to the RRHs in the RRH cluster, and indicate to the network their determined association rule(s)/mapping relationship(s) between the entries in the vector of frequency offset estimates and the RRHs in the RRH cluster.

The vector of frequency offset estimates could be in other forms as well such as: (1) a vector of scaled frequency offset estimates (e.g., scaled by UN (similar to those obtained under Option-1.2), with each entry in the vector corresponding to a RRH in the RRH cluster; (2) a vector of selected candidate frequency offset estimates from a codebook for frequency offset (similar to those obtained under Option-1.3), with each entry in the vector corresponding to a RRH in the RRH cluster; (3) a vector of indices of the selected candidate frequency offset estimates in the codebook for frequency offset (similar to those obtained under Option-1.3), with each entry in the vector corresponding to a RRH in the RRH cluster; (4) a vector of selected candidate scaled frequency offset estimates from a codebook for scaled frequency offset (similar to those obtained under Option-1.4), with each entry in the vector corresponding to a RRH in the RRH cluster' and/or (5) A vector of indices of the selected candidate scaled frequency offset estimates in the codebook for scaled frequency offset (similar to those obtained under Option-1.4), with each entry in the vector corresponding to a RRH in the RRH cluster.

Figure 11:
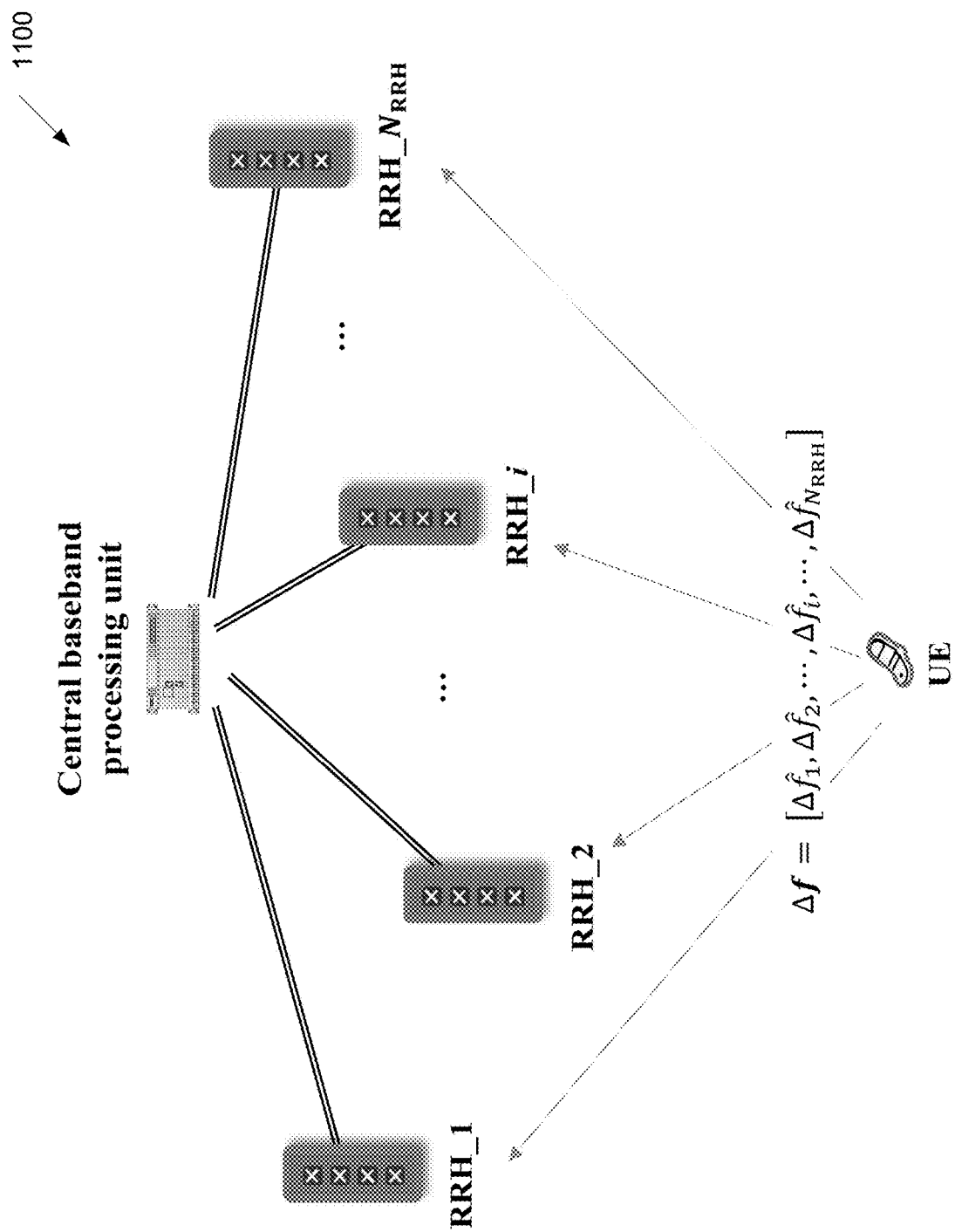
FIG. 11 illustrates another example of UE reporting RRH-specific frequency offset estimates according to embodiments of the present disclosure.

FIG. 11 illustrates another example of UE reporting RRH-specific frequency offset estimates 1100 according to embodiments of the present disclosure. An embodiment of the UE reporting the RRH-specific frequency offset estimates 1100 shown in FIG. 11 is for illustration only.

The UE could report to the network the vector of frequency offset estimates to one or more RRHs in the RRH cluster through their designated resource(s) configured/indicated to the UE. In the example shown in FIG. 11, the UE transmits to network the vector of frequency offset estimates for all RRHs in the RRH cluster, and the network would perform frequency calibration for all RRHs.

In addition to the above discussed design options, the UE could report to the network one or more differential frequency offset estimates for one or more RRHs in the RRH cluster. The UE could determine the differential frequency offset estimate(s) based on one or more reference frequency offset estimates for one or more RRHs in the RRH cluster. For instance, denote two frequency offset estimates for RRH_1 and RRH_2 by $\Delta\hat{f}_1$ and $\Delta\hat{f}_2$. Consider $\Delta\hat{f}_2$ as the reference frequency offset estimate. The differential frequency offset estimate for RRH_1 could be computed as $d\hat{f}_1=\Delta\hat{f}_1-\Delta\hat{f}_2$ (or $d\hat{f}_1=\Delta\hat{f}_2-\Delta\hat{f}_1$) (relative difference) or $d\hat{f}_1=|\Delta\hat{f}_1-\Delta\hat{f}_2|$ (absolute difference). The reference RRH(s) in the RRH cluster with which the reference frequency offset estimate(s) are associated could be predefined, and known to both the network and the UE. For example, the reference RRH could be the RRH with the lowest RRH ID in the RRH cluster (or the first RRH in the list of RRHs configured to the UE).

Alternatively, the UE could be indicated by the network the reference RRHs (and/or the reference RRH IDs) in the RRH cluster. The UE could also autonomously determine the reference RRH(s) in the RRH cluster with which the reference frequency offset estimate(s) is associated. The UE could report to the network their determined reference RRH(s) in form of RRH ID(s)/index(s).

Figure 12:
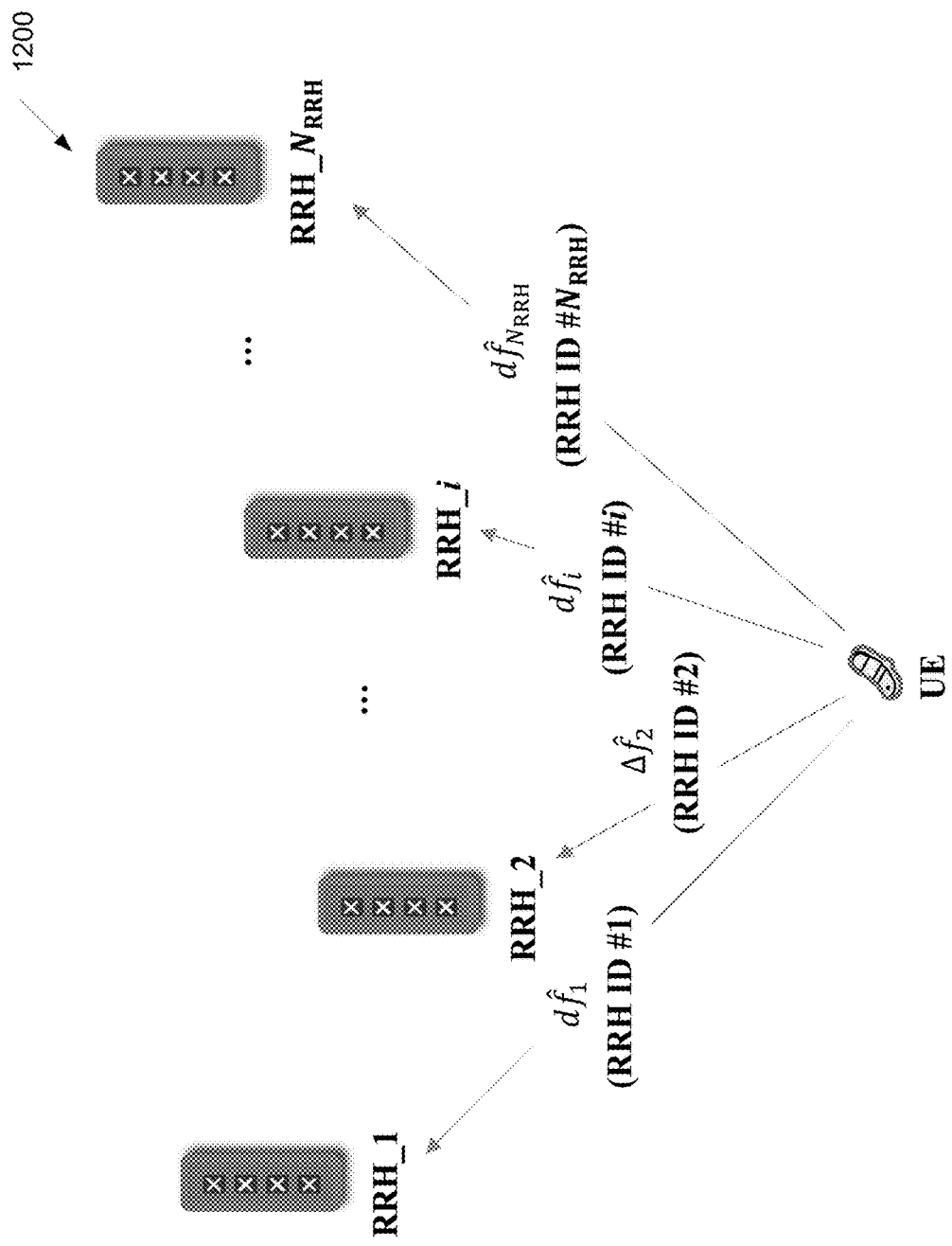
FIG. 12 illustrates an example of UE reporting RRH-specific differential frequency offset estimates according to embodiments of the present disclosure.

FIG. 12 illustrates an example of UE reporting RRH-specific differential frequency offset estimates 1200 according to embodiments of the present disclosure. An embodiment of the UE reporting the RRH-specific differential frequency offset estimates 1200 shown in FIG. 12 is for illustration only.

In one embodiment of Option-1.A, the UE could report to the network the exact values of the differential frequency offset estimate(s) for one or more RRHs in the RRH cluster through the designated resource(s) for the corresponding RRH(s). The UE could also report to the network the RRH ID along with the report of the differential frequency offset estimate for the RRH. In FIG. 12, a conceptual example charactering differential frequency offset estimate reporting is depicted.

As can be seen from FIG. 12, RRH_2 is regarded as the reference RRH, and the UE could report to the network the frequency offset estimate $\Delta\hat{f}_2$ for RRH_2. For other RRHs in the RRH cluster such as RRH_i (i≠2), the UE could report to the network the differential frequency offset estimates for them such as $d\hat{f}_i=\Delta\hat{f}_i-\Delta\hat{f}_2$ ($d\hat{f}_i=\Delta\hat{f}_2-\Delta\hat{f}_i$) or $d\hat{f}_i=|\Delta\hat{f}_i-\Delta\hat{f}_2|$ with a sign indicator for RRH_i. As discussed above, the UE could be indicated by the network the reference RRH(s) in the RRH cluster such as RRH_2 in FIG. 12. The UE could also autonomously determine the reference frequency offset estimate(s), and therefore the corresponding reference RRH (s) such as RRH_2 in FIG. 12.

In this case, the UE would need to report to the network that RRH_2 is regarded as the reference RRH. Upon receiving the differential frequency offset estimate(s) reported from the UE, the network could recover the exact frequency offset estimate(s) for the corresponding RRH(s) from the differential frequency offset estimate(s), and calibrate the carrier frequency value(s) for each RRH in the RRH cluster for the UE by compensating for the corresponding estimated frequency offset value(s).

In one embodiment of Option-1.B, the UE could first scale the differential frequency offset estimate(s) by a known factor. For instance, the UE could normalize the differential frequency offset estimate for RRH_j by the carrier frequency $f_0$, and obtain the scaled version as $d\hat{f}_j/f_0$. The UE could then report to the network the scaled version(s) of the differential frequency offset estimate(s) for one or more RRHs in the RRH cluster through the designated resource(s) for the corresponding RRH(s).

Similar to Option-1.A, the UE could report to the network the RRH ID along with the report of the scaled differential frequency offset estimate for the RRH. As discussed above, the UE could be indicated by the network the reference RRH(s) in the RRH cluster. The UE could also autonomously determine the reference frequency offset estimate(s), and therefore the corresponding reference RRH(s). In this case, the UE would need to report to the network which RRH(s) (e.g., in form of the RRH ID(s)) is regarded as the reference RRH(s).

Under certain settings, the UE may also need to indicate to the network the applied scaling factor. Whether to report the exact or scaled differential frequency offset estimate(s) could be predefined/preconfigured, and known to both the network and the UE. Alternatively, the UE could be configured/indicated by the network whether to report the exact or scaled values of the differential frequency offset estimate(s). Further, the UE could indicate to the network whether the reported differential frequency offset estimates are the exact values or scaled by the known scaling factor.

In one embodiment of Option-1.C, the UE could be configured by the network one set of candidate values of differential frequency offset (codebook for differential frequency offset), denoted by W={$w_1, w_2, \ldots, w_P$}. For a given differential frequency offset estimate $d\hat{f}_j$ for RRH_j (e.g., $d\hat{f}_j = d\hat{f}_j - d\hat{f}_i (d\hat{f}_j = d\hat{f}_i - d\hat{f}_j)$ or $d\hat{f}_j = |d\hat{f}_j - d\hat{f}_i|$ assuming RRH_i as the reference RRH), the UE could select one candidate differential frequency offset value from the set/codebook of candidate differential frequency offset values that best characterizes the differential frequency offset estimate.

For instance, the selected candidate differential frequency offset value for RRH_j (denoted by $d\hat{g}_j$) could have the smallest/least Euclidean distance with the actual differential frequency offset estimate for RRH_j ($d\hat{f}_j$) than the other candidate differential frequency offset values in the set/codebook of all candidate differential frequency offset values. The UE could report to the network the selected candidate differential frequency offset value(s) for one or more RRHs in the RRH cluster.

Alternatively, the UE could report to the network the index(es) of the selected candidate differential frequency offset value(s) for one or more RRHs in the RRH cluster in the set/codebook of all candidate differential frequency offset values (denoted by differential FOI(s)–dFOI(s)). If the codebook for differential frequency offset W contains only absolute-valued codewords/entries, the UE could also report a sign indicator along with the report of the selected candidate differential frequency offset value or the dFOI. The UE could also report to the network the RRH ID along with the report of the selected candidate differential frequency offset value (or the dFOI) for the RRH. As discussed above, the UE could be indicated by the network the reference RRH(s) in the RRH cluster. The UE could also autonomously determine the reference frequency offset estimate(s), and therefore the corresponding reference RRH(s). In this case, the UE would need to report to the network which RRH(s) (e.g., in form of the RRH ID(s)) is regarded as the reference RRH(s).

In one embodiment of Option-1.D, the UE could first scale the differential frequency offset estimate(s) by a known factor. For instance, the UE could normalize the differential frequency offset estimate for RRH_j by the carrier frequency $f_0$, and obtain the scaled version as $d\hat{f}_j/f_0$. The UE could be configured by the network a set of candidate values of scaled differential frequency offset (codebook for scaled differential frequency offset). For a scaled differential frequency offset estimate, the UE could select one candidate scaled differential frequency offset value from the set/codebook of candidate scaled differential frequency offset values that best characterizes the scaled differential frequency offset estimate.

For instance, the selected candidate scaled differential frequency offset value could have the smallest/least Euclidean distance with the actual scaled differential frequency offset estimate than the other candidate scaled differential frequency offset values in the set/codebook of all candidates scaled differential frequency offset values. The UE could report to the network the selected candidate scaled differential frequency offset values for one or more RRHs in the RRH cluster.

Alternatively, the UE could report to the network the index(s) of the selected candidate scaled differential frequency offset(s) for one or more RRHs in the RRH cluster in the set/codebook of all candidates scaled differential frequency offset values. If the codebook for scaled differential frequency offset contains only absolute-valued codewords/entries, the UE could also report a sign indicator along with the report of the selected candidate scaled differential frequency offset value or the index of the selected candidate scaled differential frequency offset value in the set/codebook of all candidates scaled differential frequency offset values. Under certain settings, the UE may need to indicate to the network the applied scaling factor.

The UE could report to the network the selected candidate scaled differential frequency offset value or its index in the codebook for scaled differential frequency offset through the designated resource(s) for the corresponding RRH. The UE could also report to the network the RRH ID along with the report of the selected candidate scaled differential frequency offset value or its index in the codebook for scaled differential frequency offset for the corresponding RRH.

As aforementioned discussed, the UE could be indicated by the network the reference RRH(s) in the RRH cluster. The UE could also autonomously determine the reference frequency offset estimate(s), and therefore the corresponding reference RRH(s). In this case, the UE would need to report to the network which RRH(s) (e.g., in form of the RRH ID(s)) is regarded as the reference RRH(s).

In one embodiment of Option-1.E, the UE could report to the network a vector of differential frequency offset estimates, with each entry in the vector corresponding to a RRH in the RRH cluster. For instance, assuming that $M_{RRH}$ RRHs in the RRH cluster are associated with the differential frequency offset estimates ("differential" RRHs), the UE could form the vector of differential frequency offset estimates as $df=[d\hat{f}_1, d\hat{f}_2, \ldots, d\hat{f}_j, \ldots, d\hat{f}_{M_{RRH}}]$. The association rule(s)/mapping relationship(s) between the entries in the vector of differential frequency offset estimates and the "differential" RRHs could be predefined, and known to both the network and the UE.

For example, the first entry in the vector corresponds to the RRH with the lowest RRH ID among the "differential" RRHs (or the first RRH in the list of "differential" RRHs configured to the UE), the second entry in the vector corresponds to the RRH with the second lowest RRH ID among the "differential" RRHs (or the second RRH in the list of "differential" RRHs configured to the UE), and so on, and the last entry in the vector corresponds to the RRH with the highest RRH ID among the "differential" RRHs (or the last RRH in the list of "differential" RRHs configured to the UE).

Note that other association rule(s)/mapping relationship(s) between the entries in the vector of differential frequency offset estimates and the "differential" RRHs in the RRH cluster are also possible. Alternatively, the UE could be indicated by the network the explicit association rule(s)/mapping relationship(s) between the entries in the vector of differential frequency offset estimates and the "differential"

RRHs in the RRH cluster. Further, the UE could autonomously determine how the entries in the vector of differential frequency offset estimates would map to the "differential" RRHs in the RRH cluster, and indicate to the network their determined association rule(s)/mapping relationship(s) between the entries in the vector of differential frequency offset estimates and the "differential" RRHs in the RRH cluster.

The vector of differential frequency offset estimates could be in other forms as well such as: (1) a vector of scaled differential frequency offset estimates (e.g., scaled by UN (similar to those obtained under Option-1.B), with each entry in the vector corresponding to a RRH in the RRH cluster; (2) a vector of selected candidate differential frequency offset estimates from a codebook for differential frequency offset (similar to those obtained under Option-1.C), with each entry in the vector corresponding to a RRH in the RRH cluster; (3) a vector of indices of the selected candidate differential frequency offset estimates in the codebook for differential frequency offset (similar to those obtained under Option-1.C), with each entry in the vector corresponding to a RRH in the RRH cluster; (4) a vector of selected candidate scaled differential frequency offset estimates from a codebook for scaled differential frequency offset (similar to those obtained under Option-1.D), with each entry in the vector corresponding to a RRH in the RRH cluster; and/or (5) a vector of indices of the selected candidate scaled differential frequency offset estimates in the codebook for scaled differential frequency offset (similar to those obtained under Option-1.D), with each entry in the vector corresponding to a RRH in the RRH cluster.

The UE could report to the network the vector of differential frequency offset estimates to one or more RRHs in the RRH cluster through their designated resource(s) configured/indicated to the UE. As discussed above, the UE could be indicated by the network the reference RRH(s) in the RRH cluster. The UE could also autonomously determine the reference frequency offset estimate(s), and therefore the corresponding reference RRH(s). In this case, the UE would need to report to the network which RRH(s) (e.g., in form of the RRH ID(s)) is regarded as the reference RRH(s).

The UE could report to the network the differential frequency offset estimate(s) for one or more RRHs in the RRH cluster following the strategies provided under Option-1.A, Option-1.B, Option-1.C, Option-1.D, and/or Option-1.E. Further, the UE could report to the network the frequency offset estimate(s) for one or more reference RRHs in the RRH cluster following the strategies discussed under Option-1.1, Option-1.2, Option-1.3, Option-1.4, and/or Option-1.5. Hence, there are many combinations of different reporting methods to report the exact/differential frequency offset estimates.

For instance, the UE could report to the network the exact frequency offset estimate(s) for the reference RRH(s) in the RRH cluster following Option-1.2, while report to the network the differential frequency offset estimate(s) for the "differential" RRH(s) in the RRH cluster following Option-1.A. The UE could be indicated by the network to follow one or more combinations of the reporting methods to report to the network the exact/differential frequency offset estimate(s).

In the above described design options, the UE would report to the network the (exact/differential) frequency offset estimates for all the RRHs in the RRH cluster for the UE. The UE could report to the network the (exact/differential) frequency offset estimates for a subset of RRHs in the RRH cluster for the UE. The UE could be indicated by the network the subset of RRHs through higher layer RRC signaling, MAC-CE activation command (e.g., by activating the subset of RRHs from a list/pool of all RRHs in the RRH cluster) or DCI signaling. Alternatively, the UE could autonomously determine the subset of RRHs in the RRH cluster, and indicate to the network the selected RRHs (e.g., in form of their RRH IDs).

The UE could be configured by the network one or more thresholds for determining (exact/differential) frequency offset estimate report(s).

For Option-1.1, Option-1.3, and Option-1.5, the UE could be configured by the network a threshold (denoted by Th_1) for comparing with the (exact) frequency offset estimate. For instance, if a frequency offset estimate is below the threshold, the UE would not report to the network the frequency offset estimate for the corresponding RRH or report to the network a zero frequency offset estimate for the corresponding RRH.

For Option-1.2, Option-1.4, and Option-1.5, the UE could be configured by the network a threshold (denoted by Th_2) for comparing with the scaled frequency offset estimate. For instance, if a scaled frequency offset estimate is below the threshold, the UE would not report to the network the scaled frequency offset estimate for the corresponding RRH or report to the network a zero scaled frequency offset estimate for the corresponding RRH.

For Option-1.A, Option-1.C, and Option-1.E, the UE could be configured by the network a threshold (denoted by Th_A) for comparing with the differential frequency offset estimate. For instance, if a differential frequency offset estimate is below the threshold, the UE would not report to the network the differential frequency offset estimate for the corresponding RRH or report to the network a zero differential frequency offset estimate for the corresponding RRH.

For Option-1.B, Option-1.D, and Option-1.E, the UE could be configured by the network a threshold (denoted by Th_B) for comparing with the scaled differential frequency offset estimate. For instance, if a scaled differential frequency offset estimate is below the threshold, the UE would not report to the network the scaled differential frequency offset estimate for the corresponding RRH or report to the network a zero scaled differential frequency offset estimate for the corresponding RRH.

Alternatively, the UE could autonomously determine/select the thresholds such as Th_1, Th_2, Th_A and/or Th_B discussed above for determining the (exact/differential) frequency offset estimate report(s). The UE could send to the network their determined threshold(s).

The UE could transmit at least one SRS resource to the network, and the network could use it to estimate the frequency offset for each RRH in the RRH cluster for the UE. The RS configuration could include at least one downlink RS resource for frequency offset estimation/tracking and at least one SRS resource, wherein the RS configuration can be joint (via one configuration) or separate (via two separate configurations). The frequency offset values for all RRHs in the RRH cluster for the UE could be acquired at the network based on both SRS measurements and the frequency offset estimate reporting from the UE.

In the above descried design options, the UE could be configured/indicated by the network to measure the RRH-specific RSs for frequency offset estimation/tracking. Alternatively, the UE could be configured/indicated by the network to measure a common RS transmitted from one or more RRHs in the RRH cluster for frequency offset estimation/tracking. If the UE could be indicated by the network the association rule(s)/mapping relationship(s) between different time/frequency components of the common RS and the RRHs, the UE could still generate different frequency offset estimates (differential frequency offset estimates) for different RRHs, and report them to the network following Option-1.1, Option-1.2, Option-1.3, Option-1.4, and/or Option-1.5 (Option-1.A, Option-1.B, Option-1.C, Option-1.D and/or Option-1.E).

If the UE is not indicated by the network any association rule(s)/mapping relationship(s) between the common RS and the RRHs, the UE could only report to the network all frequency offset estimates obtained from measuring the common RS for frequency offset estimation/tracking. The UE could be configured by the network to measure the RRH-specific RSs or the common RS for frequency offset estimation/tracking in a periodic/semi-persistent manner, and report to the network the corresponding measurement results.

Alternatively, the UE could be triggered by the network to measure the RRH-specific RSs or the common RS for frequency offset estimation/tracking in an aperiodic manner. The UE could also trigger the network to send the RRH-specific RSs or the common RS for frequency offset estimation/tracking.

In the present disclosure, a frequency quality reporting is defined, which could correspond to: (1) frequency reporting only; (2) frequency offset reporting only; and/or (3) a hybrid of both frequency reporting and frequency offset reporting.

For instance, if the frequency quality reporting corresponds to the frequency offset reporting only, the frequency quality reporting could include at least one of the following cases: (1) Case-A: One or more frequency offset estimates for one or more RRHs in the RRH cluster; (2) Case-B: One or more scaled frequency offset estimates for one or more RRHs in the RRH cluster; (3) Case-C: One or more selected candidate frequency offset estimates from a codebook for frequency offset for one or more RRHs in the RRH cluster; (4) Case-D: One or more indices of the selected candidate frequency offset estimates in the codebook for frequency offset for one or more RRHs in the RRH cluster; (5) Case-E: One or more selected candidate scaled frequency offset estimates from a codebook for scaled frequency offset for one or more RRHs in the RRH cluster; (6) Case-F: One or more indices of the selected candidate scaled frequency offset estimates in the codebook for scaled frequency offset for one or more RRHs in the RRH cluster; (7) Case-G: One or more differential frequency offset estimates for one or more RRHs in the RRH cluster; (8) Case-H: One or more scaled differential frequency offset estimates for one or more RRHs in the RRH cluster; (9) Case-I: One or more selected candidate differential frequency offset estimates from a codebook for differential frequency offset for one or more RRHs in the RRH cluster; (10) Case-J: One or more indices of the selected candidate differential frequency offset estimates in the codebook for differential frequency offset for one or more RRHs in the RRH cluster; (11) Case-K: One or more selected candidate scaled differential frequency offset estimates from a codebook for scaled differential frequency offset for one or more RRHs in the RRH cluster; and (12) Case-L: One or more indices of the selected candidate scaled differential frequency offset estimates in the codebook for scaled differential frequency offset for one or more RRHs in the RRH cluster.

Case-A to Case-L can be extended to: (i) the frequency quality reporting corresponds to the frequency reporting only, and (ii) the frequency quality reporting corresponds to the hybrid of both frequency reporting and frequency offset reporting. Further, the frequency quality reporting can be multiplexed only with a WB CSI report, where the CSI report is periodic or semi-persistent. The frequency quality reporting can be reported only via PUCCH. Alternatively, the frequency quality reporting can be reported only when rank 1 is reported via RI, but the max allowed rank value can be more than 1.

A UE is configured with the frequency quality reporting that can be transmitted, for example, as part of the CSI report (hence multiplexed with other CSI parameters), and/or by multiplexing it with HARQ-ACK transmission and/or Scheduling Request (SR). In one example, the frequency quality reporting can be transmitted via SR if it's payload (number of bits) is less or equal to B1 (e.g., B1=1). In one example, the frequency quality reporting can be transmitted via HARQ-ACK if it's payload (number of bits) is less or equal to B1 (e.g., B1=1). In one example, the frequency quality reporting can be transmitted via SR or HARQ-ACK if the number of RRHs=2 (i.e., number of frequency quality reporting is 1).

When multiplexed with other CSI parameters, at least one of the following examples can be used.

In one example, the frequency quality reporting is via a separate (new) CSI parameter, e.g., FQI (frequency quality indicator).

In one example, the frequency quality reporting is joint with an existing CSI parameter (p), and the parameter (p) when reported indicates both a value for the CSI existing parameter and the frequency quality reporting. At least one of the following examples can be used for the existing CSI parameter (p). In such example: (1) the parameter (p) is a rank indicator (RI). When reported, RI indicates both a value for the rank and the frequency quality reporting; (2) the parameter (p) is a CSI-RS resource indicator (CRI). When reported, CRI indicates both a CSI-RS resource and the frequency quality reporting; (3) the parameter (p) is a layer indicator (LI). When reported, LI indicates both a layer and the frequency quality reporting; (4) the parameter (p) is a precoding matrix indicator (PMI) for a 2 port CSI-RS resource. When reported, PMI indicates both a precoding matrix and the frequency quality reporting; (5) the parameter (p) is a first precoding matrix indicator (PMI1) for a X>2 port CSI-RS resource. When reported, PMI1 indicates both first components of a precoding matrix and the frequency quality reporting; (6) the parameter (p) is a second precoding matrix indicator (PMI2) for a X>2 port CSI-RS resource. When reported, PMI2 indicates both second components of a precoding matrix and the frequency quality reporting; (7) the parameter (p) is a channel quality indicator (CQI). When reported, CQI indicates both a CQI value and frequency quality reporting; (8) the parameter (p) is a layer 1 RSRP (L1-RSRP). When reported, L1-RSRP indicates both a RSRP value and the frequency quality reporting; and (9) the parameter (p) is a layer 1 SINR (L1-SINR). When reported, L1-SINR indicates both a SINR value and the frequency quality reporting.

In one example, the frequency quality reporting is using reserved or unused code points of an existing CSI parameter (p) to indicate the frequency quality reporting. At least one of the following examples can be used for the existing CSI parameter (p): (1) the parameter (p) is a rank indicator (RI); (2) the parameter (p) is a CSI-RS resource indicator (CRI); (3) the parameter (p) is a layer indicator (LI); (4) the parameter (p) is a precoding matrix indicator (PMI) for a 2 port CSI-RS resource; (5) the parameter (p) is a first precoding matrix indicator (PMI1) for a X>2 port CSI-RS resource; (6) the parameter (p) is a second precoding matrix indicator (PMI2) for a X>2 port CSI-RS resource; (7) the parameter (p) is a channel quality indicator (CQI); (8) the parameter (p) is a layer 1 RSRP (L1-RSRP); and (9) the parameter (p) is a layer 1 SINR (L1-SINR).

In one example, the usage of an existing CSI parameter (p) can be configured (e.g., RRC) as either as a CSI parameter or as a parameter for the frequency quality reporting. A code point of the parameter (p) indicates the CSI parameter of the frequency quality reporting depending on the configured usage.

Figure 13:
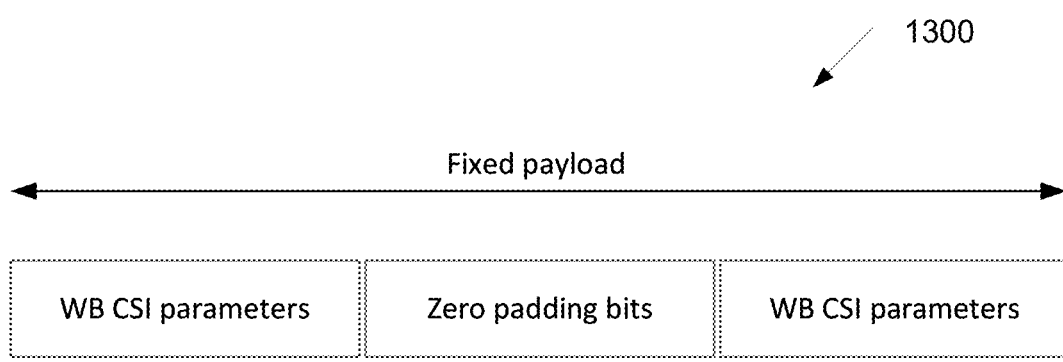
FIG. 13 illustrates an example of wideband CSI payload according to embodiments of the present disclosure.

FIG. 13 illustrates an example of wideband CSI 1300 according to embodiments of the present disclosure. An embodiment of the wideband CSI 1300 shown in FIG. 13 is for illustration only.

The frequency quality reporting can be multiplexed with a periodic or semi-persistent (P/SP) CSI with wideband (WB) reporting. For such WB CSI reporting, the CSI payload (number of bits) can be fixed regardless of the value of the reported CSI parameters such as RI (although the CSI payload can vary for different rank values). In order to ensure fixed CSI payload, a number of zero-padding bits can be appended with the CSI bits (as illustrated in FIG. 13).

At least one of the following examples can be used for multiplexing the frequency quality reporting with the WB CSI: (1) in one example, a portion or all of the zero padding bits appended in the WB CSI report is used to report the frequency quality reporting. The least significant bits (LSBs) of the zero padding bits can be used for the frequency quality reporting. Or the most significant bits (MSBs) of the zero padding bits can be used for the frequency quality reporting; and/or (2) in one example, the frequency quality reporting is multiplexed with the WB CSI parameters, wherein the multiplexing method is according to one of the examples described above.

Figure 14:
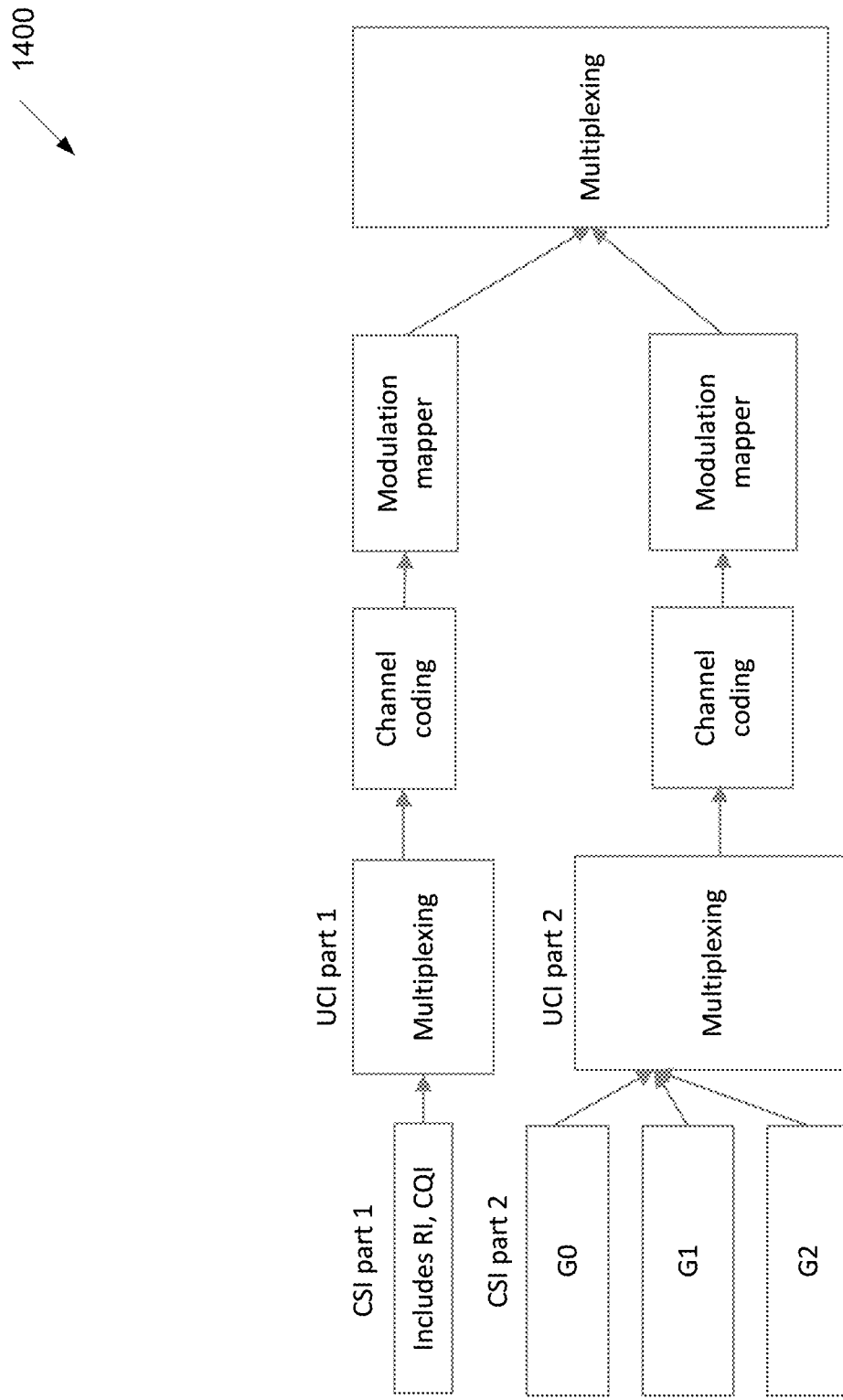
FIG. 14 illustrates an example of two-part CSI according to embodiments of the present disclosure.

FIG. 14 illustrates an example of two-part CSI 1400 according to embodiments of the present disclosure. An embodiment of the two-part CSI 1400 shown in FIG. 14 is for illustration only.

The frequency quality reporting can be multiplexed with an aperiodic (AP) CSI with subband (SB) reporting. For such SB reporting, the CSI can be partitioned into two parts, CSI part 1 and CSI part 2. The CSI part 1 includes RI and CQI (for the first codeword), and is multiplexed with UCI part 1. The CSI report includes LI, PMI, and CQI (for the second codeword when rank >4 is reported), and is multiplexed with UCI part 2. Here, UCI part 1 and UCI part 2 are parts of a two-part UCI (as illustrated in FIG. 14).

At least one of the following examples can be used for multiplexing the frequency quality reporting with the SB CSI.

In one example, the frequency quality reporting is multiplexed with a CSI parameter in CSI part 1. For example, the frequency quality reporting is multiplexed with CQI (for the first code word) or RI, wherein the multiplexing method is according to one of the examples described above.

In one example, the frequency quality reporting is multiplexed with a CSI parameter in CSI part 2. For example, the frequency quality reporting is multiplexed with CQI (for the second code word when rank >4 is reported) or PMI or LI, wherein the multiplexing method is according to one of the examples described above.

In one example, the CSI part 2 is partitioned into three groups G0, G1, and G2 (as in Rel. 15/16 SB CSI reporting) and the UE reports either G0 or (G0, G1) or (G0, G1, G2) depending on the resource allocation for the CSI reporting and the total CSI part 2 payload (as described in UCI omission in Rel. 15/16 NR specification).

In one instance, the frequency quality reporting is multiplexed with a CSI parameter in G0, wherein the multiplexing method is according to one of the examples described above.

In another instance, the frequency quality reporting is multiplexed with a CSI parameter in G0 if only G0 is transmitted (reported) in UCI part 2 (i.e. G1 and G2 are omitted or not reported); the frequency quality reporting is multiplexed with a CSI parameter in G1 if only (G0, G1) is transmitted (reported) in UCI part 2 (i.e. G2 is omitted or not reported); and the frequency quality reporting is multiplexed with a CSI parameter in G2 if (G0, G1, G2) is transmitted (reported) in UCI part 2.

In addition to the above described frequency quality reporting assisted network side frequency synchronization/calibration (Alt. 1), there could be other design alternatives to align the frequencies between different RRHs and/or between the network and the UE: (1) Alt. 2: the UE could estimate frequency offsets and/or frequencies for all RRHs in the RRH cluster. The UE would not report to the network any form of the frequency offset estimates and/or frequency estimates. Instead, the UE would autonomously compensate the frequency offsets for the downlink receptions such as PDCCHs/PDSCHs from the RRHs in the RRH cluster; and (2) Alt. 3: the UE could be configured/indicated by the network to measure the frequency of one of the RRHs in the RRH cluster (e.g., by measuring certain DL RS(s) such as TRS(s) from the RRH). The UE could then transmit SRS(s)/PUCCH(s) to the RRHs in the RRH cluster using the estimated frequency. In this case, the UE would not report to the network any form of the frequency offset estimates and/or frequency estimates.

The UE could be indicated/configured by the network to follow one or more of the design alternatives (e.g., Alt. 1, Alt. 2, and Alt. 3 discussed above) for frequency offset/frequency estimation and/or reporting. Alternatively, the UE could autonomously decide which design alternative(s) to follow for frequency offset/frequency estimation and/or reporting. In this case, the UE may need to indicate to the network their selected design alternative(s).

In one embodiment, a UE reporting assisted phase/amplitude calibration method in a distributed RRH system is provided.

Figure 15:
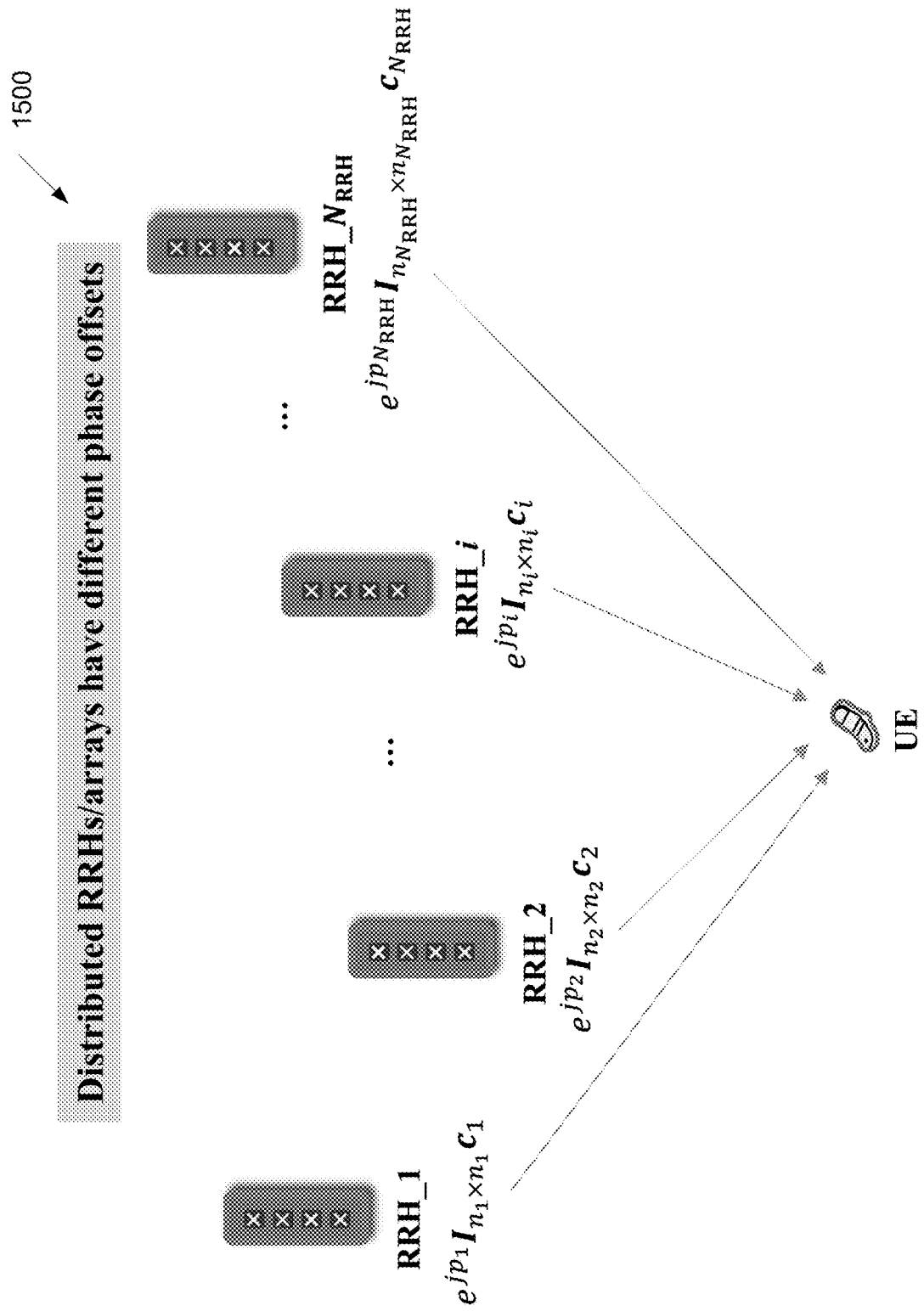
FIG. 15 illustrates an example of RRH-specific array phase offsets in a distributed RRH system according to embodiments of the present disclosure.

FIG. 15 illustrates an example of RRH-specific array phase offsets 1500 in a distributed RRH system according to embodiments of the present disclosure. An embodiment of the RRH-specific array phase offsets 1500 shown in FIG. 15 is for illustration only.

Because of manufacturing inaccuracies, a variety of impairments such as geometrical and electrical tolerances cause non-uniform phase and/or amplitude characteristics (array phase offset and/or array amplitude offset) of the individual antenna elements. These impairments could be significant for geographically separated/non-co-located RRHs/antenna arrays because the geographically separated/non-co-located RRHs/antenna arrays could experience significantly different environmental conditions such as temperature and etc.

First, consider inter-RRH phase offsets only, and assume that the phase variations/offsets between the antenna elements within the same RRH/antenna panel (i.e., intra-RRH phase offsets) are constant/identical. Denote the number of antenna elements/ports at RRH_i by $n_i$ and its transmit data by $c_i$, which is a $n_i \times 1$ vector. Denote the phase offset at each antenna element/port at RRH_i by $p_i$.

For a total of $N_{RRH}$ RRHs in the RRH cluster for the UE, the corresponding wideband transmit signal can be expressed as:

$$c = \underbrace{\begin{bmatrix} e^{jp_1} I_{n_1 \times n_1} & \cdots & 0 \\ \vdots & \ddots & \vdots \\ 0 & \cdots & e^{jp_{N_{RRH}}} I_{n_{N_{RRH}} \times n_{N_{RRH}}} \end{bmatrix}}_{P} \begin{bmatrix} c_1 \\ \vdots \\ c_{N_{RRH}} \end{bmatrix},$$

where $I_{n_i \times n_i}$ (i=1, 2, . . . , $N_{RRH}$) is an $n_i \times n_i$ identity matrix. It is evident from the above equation that the network needs to know the phase offsets between different RRHs (i.e., the matrix P) so that the network could apply, e.g., $P^{-1}$, to calibrate the inter-RRH phase offsets. In FIG. 15, a conceptual example characterizing the phase offsets between different RRHs in the RRH cluster for the UE is depicted.

Similarly, consider inter-RRH amplitude offsets only, and assume that the amplitude variations/offsets between the antenna elements within the same RRH/antenna panel (i.e., intra-RRH amplitude offsets) are constant/identical. Denote the amplitude offset at each antenna element/port at RRH_i by $\alpha_i$ The corresponding wideband transmit signal can then be expressed as:

$$c = \underbrace{\begin{bmatrix} a_1 I_{n_1 \times n_1} & \cdots & 0 \\ \vdots & \ddots & \vdots \\ 0 & \cdots & a_{N_{RRH}} I_{n_{N_{RRH}} \times n_{N_{RRH}}} \end{bmatrix}}_{A} \begin{bmatrix} c_1 \\ \vdots \\ c_{N_{RRH}} \end{bmatrix}.$$

If the network knows the amplitude offsets between different RRHs (i.e., the matrix A), the network could apply, e.g., $A^{-1}$, to calibrate the inter-RRH amplitude offsets. Consider both inter-RRH phase and amplitude offsets, and assume that the intra-RRH phase/amplitude variations/offsets are constant/identical. The wideband transmit signal can be expressed as:

$$c = \underbrace{\begin{bmatrix} a_1 e^{jp_1} I_{n_1 \times n_1} & \cdots & 0 \\ \vdots & \ddots & \vdots \\ 0 & \cdots & a_{N_{RRH}} e^{jp_{N_{RRH}}} I_{n_{N_{RRH}} \times n_{N_{RRH}}} \end{bmatrix}}_{Z} \begin{bmatrix} c_1 \\ \vdots \\ c_{N_{RRH}} \end{bmatrix}.$$

It is evident that if the network knows both the amplitude and phase offsets between different RRHs (i.e., the matrix Z), the network could apply, e.g., $Z^{-1}$, to calibrate the inter-RRH amplitude and phase offsets.

Based on the above discussions, the UE could measure: (1) the phase offset for each RRH in the RRH cluster, (2) the amplitude offset for each RRH in the RRH cluster, and (3) both amplitude and phase offsets for each RRH in the RRH cluster. The UE could be indicated/configured by the network to measure and/or report one or more of the array impairment measurement metrics (e.g., from (1), (2) and (3)).

Alternatively, the UE could autonomously determine the array impairment measurement metric(s). In this case, the UE may need to indicate to the network their selected array impairment measurement metric(s). In this disclosure, the inter-RRH phase offset in (1) is regarded as the array impairment measurement metric to explain and discuss the UE reporting assisted network side RRH/array calibration. The provided solutions can be equally applied to other array impairment measurement metrics such as those in (2) and (3) as well.

The UE could estimate the inter-RRH phase offset(s) by measuring certain DL RSs (such as CSI-RSs, TRSs, and etc.) transmitted from one or more RRHs in the RRH cluster and report to the network their estimated phase offset(s). Alternatively, the UE could transmit uplink sounding signals to one or more RRHs in the RRH cluster for the purpose of phase calibration. In the following, several design options of UE assisted phase (offset) calibration at the network side are presented.

The UE could be first configured/indicated by the network to measure one or more RSs (such as CSI-RSs, TRSs, and etc.) for phase offset estimation/tracking from each RRH (RRH-specific RSs for phase offset estimation/tracking). The UE could then be configured/indicated by the network to report to the network the corresponding measurement results from measuring the RRH-specific RSs for phase offset estimation/tracking. Here, the measurement results could correspond to the estimated phase offsets for each RRH in the RRH cluster for the UE.

The RRH-specific RSs for phase offset estimation/tracking from different RRHs could be multiplexed in time, frequency, spatial and/or code domains. For instance, the UE could be configured by the network to measure the RRH-specific RSs for phase offset estimation/tracking from different RRHs in different symbols/slots/etc. For another example, the UE could be configured by the network to measure the RRH-specific RSs for phase offset estimation/tracking from different RRHs in different resource blocks. The UE could also be indicated by the network the association rule(s)/mapping relationship(s) between the RRH IDs/indices and the RRH-specific RSs for phase offset estimation/tracking. In this case, the UE could know which RRH(s) the corresponding RSs for phase offset estimation/tracking are transmitted from.

The UE could be configured by the network to report the measurement results through certain time, frequency, spatial and/or code domain resources. For instance, the UE could be configured by the network to report the measurement results for different RRHs through different symbols/slots/etc. For another example, the UE could be configured by the network to report the measurement results for different RRHs through different resource blocks. The UE could be indicated by the network the association rule(s)/mapping relationship(s) between the RRH-specific RSs for phase offset estimation/tracking and the reports and/or between the RRH IDs/indices and the reports.

Alternatively, the UE could autonomously determine the association rule(s)/mapping relationship(s) between the RRH-specific RSs for phase offset estimation/tracking (or the RRH IDs/indices) and the reports, and indicate to the network the association rule(s)/mapping relationship(s).

Denote the exact value of the estimated phase offset for RRH_i by $\Delta \hat{p}_i$. Note that the notion of $\Delta \hat{p}_i$ is for illustrative purpose. The unit for the phase offset could be degree, radian and etc.

Figure 16A:
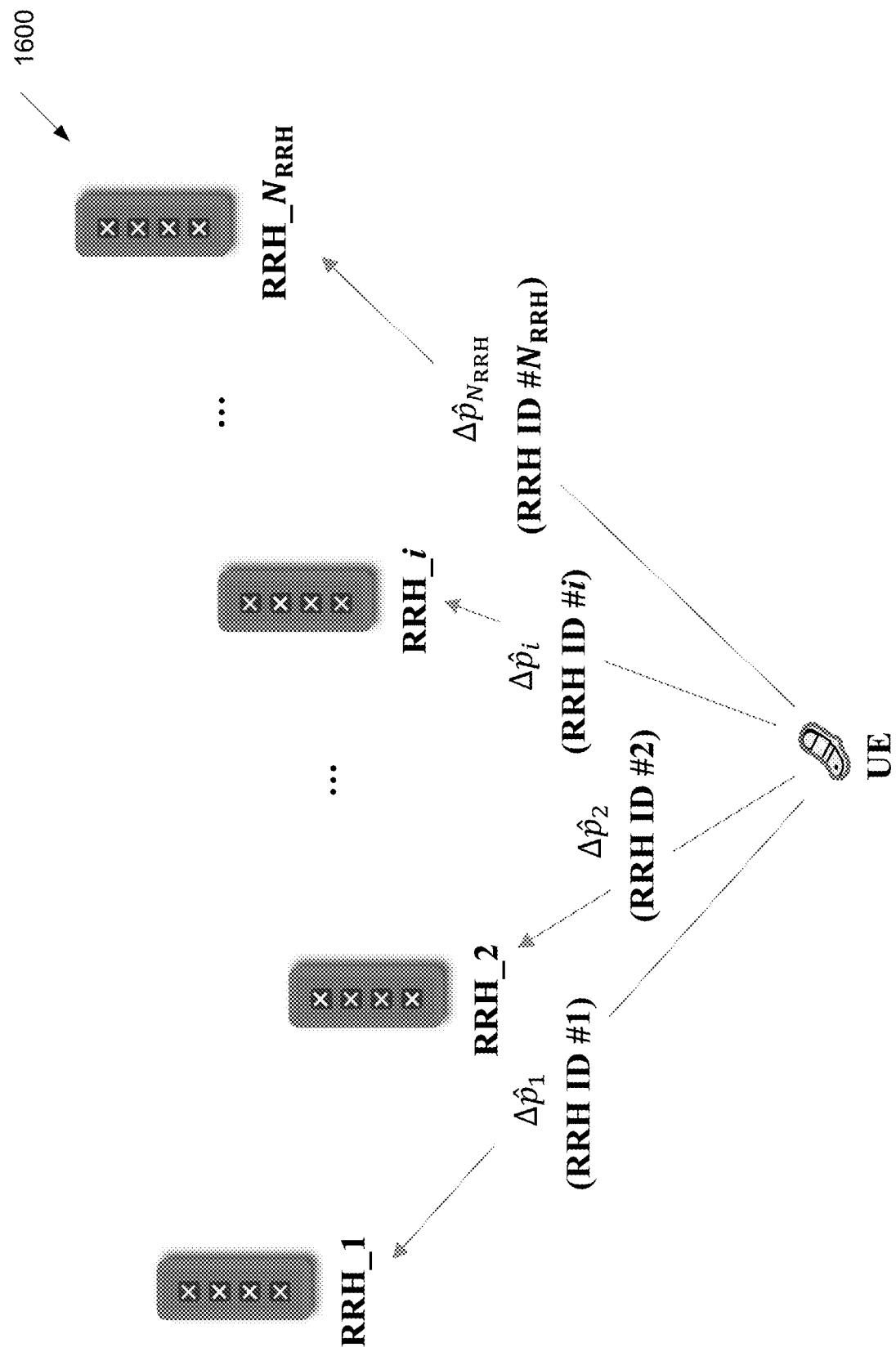
FIG. 16A illustrates an example of UE reporting RRH-specific array phase offset estimates according to embodiments of the present disclosure.

FIG. 16A illustrates an example of UE reporting RRH-specific array phase offset estimates 1600 according to embodiments of the present disclosure. An embodiment of the UE reporting the RRH-specific array phase offset estimates 1600 shown in FIG. 16A is for illustration only.

In one embodiment of Option-2.1, the UE could report to the network the exact values of their estimated phase offsets for each RRH in the RRH cluster through the designated resource(s) for the corresponding RRH. The UE could also report to the network the RRH ID along with the report of the estimated phase offset for the RRH.

In FIG. 16A, a conceptual example charactering separately reporting the estimated phase offset values for each RRH in the RRH cluster is presented. Upon receiving the estimated phase offset(s) reported from the UE, the network could calibrate the phase value(s) for each RRH/antenna array in the RRH cluster for the UE by compensating for the corresponding estimated phase offset value(s) (see FIG. 16B).

Figure 16B:
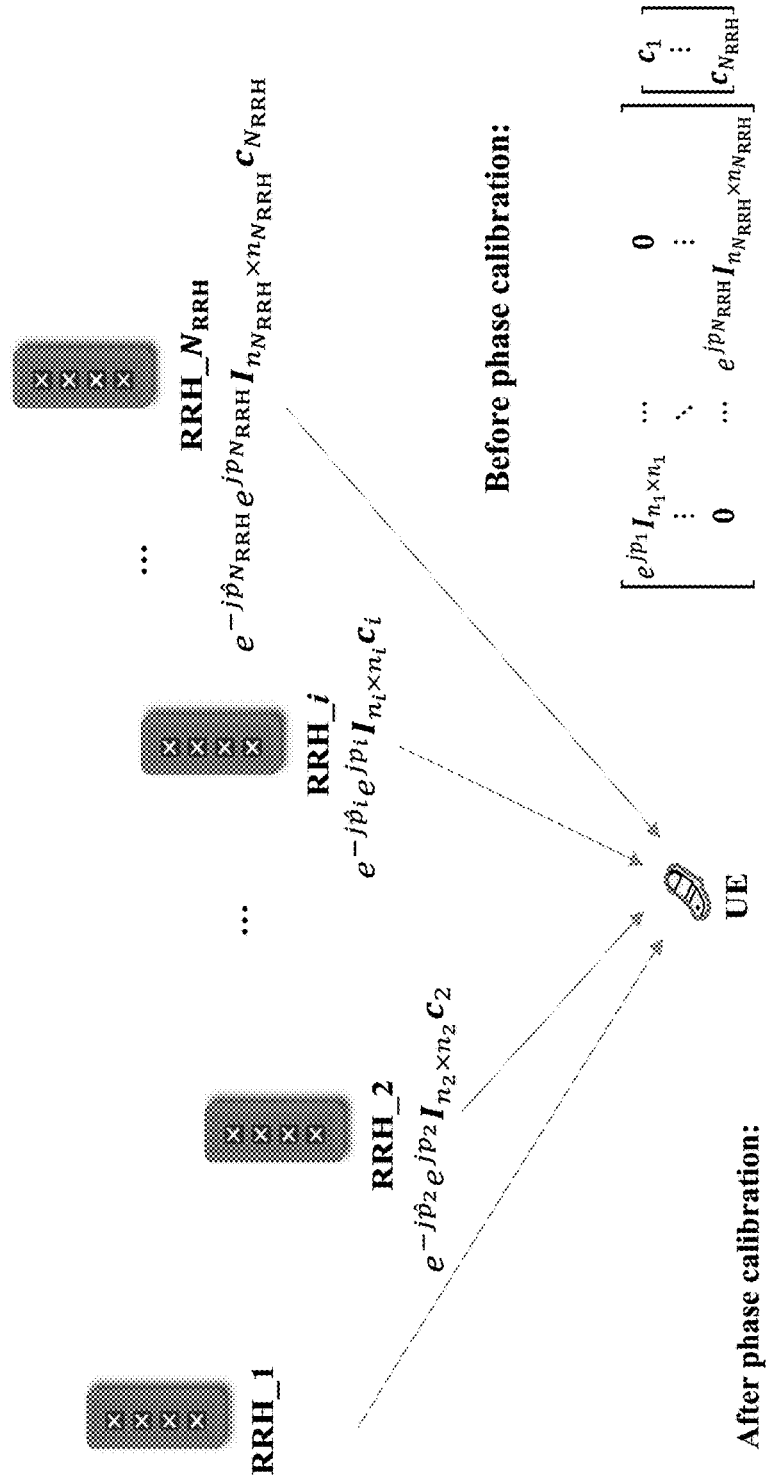
FIG. 16B illustrates an example of applying RRH-specific array phase calibration in a distributed RRH system according to embodiments of the present disclosure.

FIG. 16B illustrates an example of applying RRH-specific array phase calibration 1650 in a distributed RRH system according to embodiments of the present disclosure. An embodiment of applying the RRH-specific array phase calibration 1650 shown in FIG. 16B is for illustration only.

In one embodiment of Option-2.2, the UE could first scale the estimated phase offset(s) by a known factor. For instance, the UE could normalize the estimated phase offset for RRH_i by and obtain the scaled version as $\Delta \hat{p}_i/\pi$. The UE could then report to the network the scaled versions of their estimated phase offsets for each RRH in the RRH cluster through the designated resource(s) for the corresponding RRH.

Similar to Option-2.1, the UE could report to the network the RRH ID along with the report of the scaled estimated phase offset for the RRH. Under certain settings, the UE may need to indicate to the network the applied scaling factor. Whether to report the exact or scaled phase offset estimate(s) could be predefined/preconfigured, and known to both the network and the UE. Alternatively, the UE could be configured/indicated by the network whether to report the exact or scaled values of the estimated phase offset(s). Further, the UE could indicate to the network whether the reported phase offset estimates are the exact values or scaled by the known scaling factor.

Figure 17:
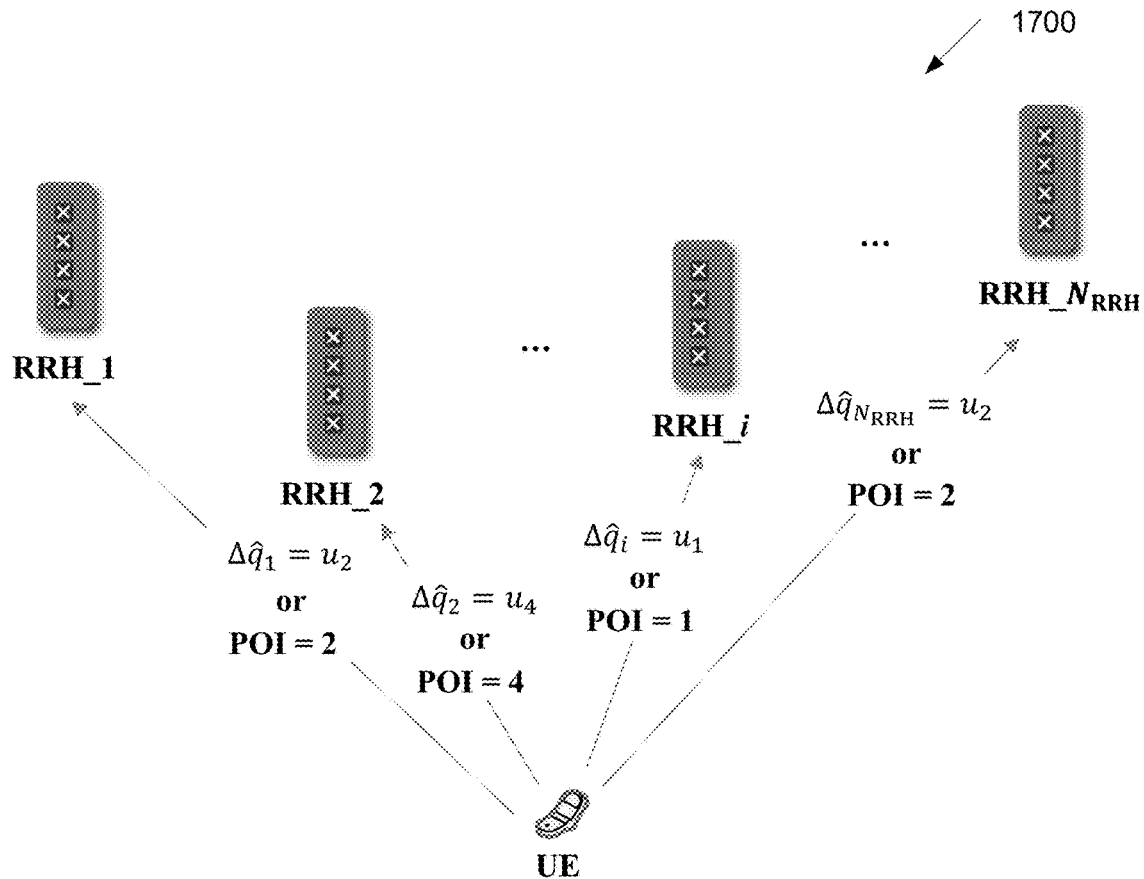
FIG. 17 illustrates an example of UE reporting RRH-specific quantized array phase offset estimates according to embodiments of the present disclosure.

FIG. 17 illustrates an example of UE reporting RRH-specific quantized array phase offset estimates 1700 according to embodiments of the present disclosure. An embodiment of the UE reporting the RRH-specific quantized array phase offset estimates 1700 shown in FIG. 17 is for illustration only.

In one embodiment of Option-2.3, the UE could be configured by the network a set of candidate values of phase offset (codebook for phase offset), denoted by $U=\{u_1, u_2, \ldots, u_K\}$. For a given estimated phase offset for RRH_i ($\Delta \hat{p}_i$), the UE could select one candidate phase offset value from the set/codebook of candidate phase offset values that best characterizes the estimated phase offset. For instance, the selected candidate phase offset value for RRH_i (denoted by $\Delta \hat{q}_i$) could have the smallest/least Euclidean distance with the actual estimated phase offset for RRH_i ($\Delta \hat{p}_i$) than the other candidate phase offset values in the set/codebook of all candidate phase offset values. The UE could report to the network the selected candidate phase offset values for each RRH in the RRH cluster.

Alternatively, the UE could report to the network the indices of the selected candidate phase offsets for each RRH in the RRH cluster in the set/codebook of all candidate phase offset values (denoted by phase offset indices (POIs)). One conceptual example describing reporting the selected candidate phase offset values or their indices in the codebook for phase offset is presented in FIG. 17 for a RRH cluster comprising of $N_{RRH}$ RRHs. The UE could report to the network the selected candidate phase offset value or its index in the codebook for phase offset through the designated resource(s) for the corresponding RRH. The UE could also report to the network the RRH ID along with the report of the selected candidate phase offset value or its index in the codebook for phase offset for the corresponding RRH.

In one embodiment of Option-2.4, the UE could first scale the estimated phase offset(s) by a known factor. For instance, the UE could normalize the estimated phase offset for RRH_i by and obtain the scaled version as $\Delta \hat{p}_i/\pi$. The UE could be configured by the network a set of candidate values of scaled phase offset (codebook for scaled phase offset). For a given scaled phase offset estimate, the UE could select one candidate scaled phase offset value from the set/codebook of candidate scaled phase offset values that best characterizes the scaled phase offset estimate.

For instance, the selected candidate scaled phase offset value could have the smallest/least Euclidean distance with the actual scaled phase offset estimate than the other candidate scaled phase offset values in the set/codebook of all candidates scaled phase offset values. The UE could report to the network the selected candidate scaled phase offset values for each RRH in the RRH cluster.

Alternatively, the UE could report to the network the indices of the selected candidate scaled phase offsets for each RRH in the RRH cluster in the set/codebook of all candidates scaled phase offset values. Under certain settings, the UE may also need to indicate to the network the applied scaling factor. The UE could report to the network the selected candidate scaled phase offset value or its index in the codebook for scaled phase offset through the designated resource(s) for the corresponding RRH. The UE could also report to the network the RRH ID along with the report of the selected candidate scaled phase offset value or its index in the codebook for scaled phase offset for the corresponding RRH.

In one embodiment of Option-2.5, the UE could report to the network a vector of estimated phase offsets, with each entry in the vector corresponding to a RRH in the RRH cluster. For instance, for a RRH cluster comprising of $N_{RRH}$ RRHs, the UE could form the vector of phase offset estimates as $\Delta p=[\Delta \hat{p}_1, \Delta \hat{p}_2, \ldots, \Delta \hat{p}_i, \ldots, \Delta \hat{p}_{N_{RRH}}]$, where $\Delta \hat{p}_i$ corresponds to the i-th RRH in the RRH cluster (RRH_i). The association rule(s)/mapping relationship(s) between the entries in the vector of phase offset estimates and the RRHs in the RRH cluster could be predefined, and known to both the network and the UE.

For example, the first entry in the vector corresponds to the RRH with the lowest RRH ID (or the first RRH in the list of RRHs configured to the UE), the second entry in the vector corresponds to the RRH with the second lowest RRH ID (or the second RRH in the list of RRHs configured to the UE), and so on, and the last entry in the vector corresponds to the RRH with the highest RRH ID (or the last RRH in the list of RRHs configured to the UE). Note that other association rule(s)/mapping relationship(s) between the entries in the vector of phase offset estimates and the RRHs in the RRH cluster are also possible.

Alternatively, the UE could be indicated by the network the explicit association rule(s)/mapping relationship(s) between the entries in the vector of phase offset estimates and the RRHs in the RRH cluster. Further, the UE could autonomously determine how the entries in the vector of phase offset estimates would map to the RRHs in the RRH cluster, and indicate to the network their determined association rule(s)/mapping relationship(s) between the entries in the vector of phase offset estimates and the RRHs in the RRH cluster.

The vector of phase offset estimates could be in other forms as well such as: (1) a vector of scaled phase offset estimates (e.g., scaled by $1/\pi$) (similar to those obtained under Option-2.2), with each entry in the vector corresponding to a RRH in the RRH cluster; (2) a vector of selected candidate phase offset estimates from a codebook for phase offset (similar to those obtained under Option-2.3), with each entry in the vector corresponding to a RRH in the RRH cluster; (3) a vector of indices of the selected candidate phase offset estimates in the codebook for phase offset (similar to those obtained under Option-2.3), with each entry in the vector corresponding to a RRH in the RRH cluster; (4) a vector of selected candidate scaled phase offset estimates from a codebook for scaled phase offset (similar to those obtained under Option-2.4), with each entry in the vector corresponding to a RRH in the RRH cluster; and/or (5) a vector of indices of the selected candidate scaled phase offset estimates in the codebook for scaled phase offset (similar to those obtained under Option-2.4), with each entry in the vector corresponding to a RRH in the RRH cluster.

Figure 18:
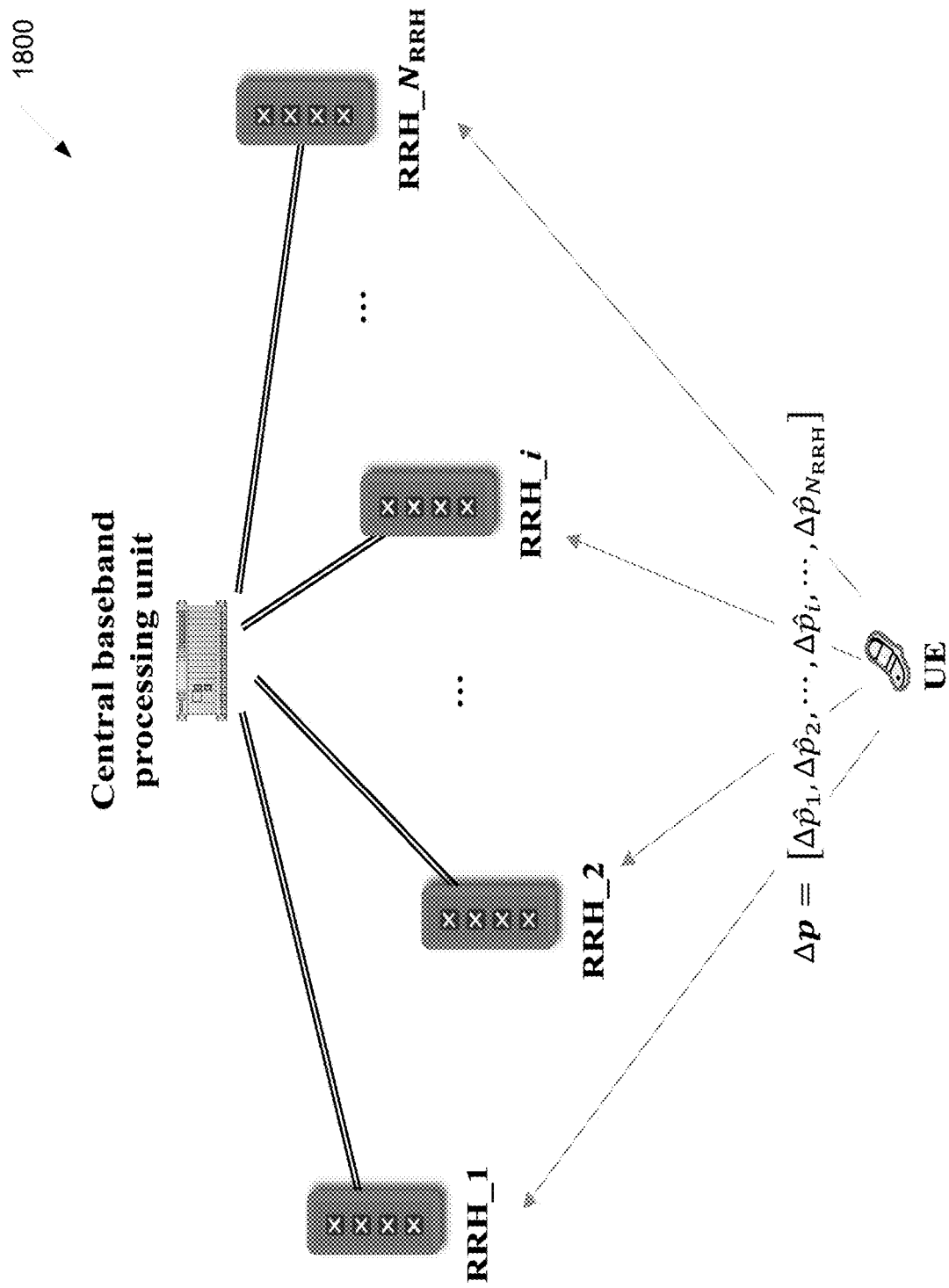
FIG. 18 illustrates another example of UE reporting RRH-specific array phase offset estimates according to embodiments of the present disclosure.

FIG. 18 illustrates another example of UE reporting RRH-specific array phase offset estimates 1800 according to embodiments of the present disclosure. An embodiment of the UE reporting the RRH-specific array phase offset estimates 1800 shown in FIG. 18 is for illustration only.

The UE could report to the network the vector of phase offset estimates to one or more RRHs in the RRH cluster through their designated resource(s) configured/indicated to the UE. In the example shown in FIG. 18, the UE transmits to the network the vector of phase offset estimates for all RRHs in the RRH cluster, and the network would perform phase calibration for all RRHs.

In addition to the above discussed design options, the UE could report to the network one or more differential phase offset estimates for one or more RRHs in the RRH cluster. The UE could determine the differential phase offset estimate(s) based on one or more reference phase offset estimates for one or more RRHs in the RRH cluster. For instance, denote two phase offset estimates for RRH_1 and RRH_2 by $\Delta\hat{p}_1$ and $\Delta\hat{p}_2$. Consider $\Delta\hat{p}_2$ as the reference phase offset estimate. The differential phase offset estimate for RRH_1 could be computed as $d\hat{p}_1=\Delta\hat{p}_1-\Delta\hat{p}_2$ (or $d\hat{p}_1=\Delta\hat{p}_2-\Delta\hat{p}_1$) (relative difference) or $d\hat{p}_1=|\Delta\hat{p}_1-\Delta\hat{p}_2|$ (absolute difference).

The reference RRH(s) in the RRH cluster with which the reference phase offset estimate(s) is associated could be predefined, and known to both the network and the UE. For example, the reference RRH could be the RRH with the lowest RRH ID in the RRH cluster (or the first RRH in the list of RRHs configured to the UE). Alternatively, the UE could be indicated by the network the reference RRHs (and/or the reference RRH IDs) in the RRH cluster. The UE could also autonomously determine the reference RRH(s) in the RRH cluster with which the reference phase offset estimate(s) is associated. The UE could report to the network their determined reference RRH(s) in form of RRH ID(s)/index(s).

In one embodiment of Option-2.A, the UE could report to the network the exact values of the differential phase offset estimate(s) for one or more RRHs in the RRH cluster through the designated resource(s) for the corresponding RRH(s). The UE could also report to the network the RRH ID along with the report of the differential phase offset estimate for the RRH.

Figure 19:
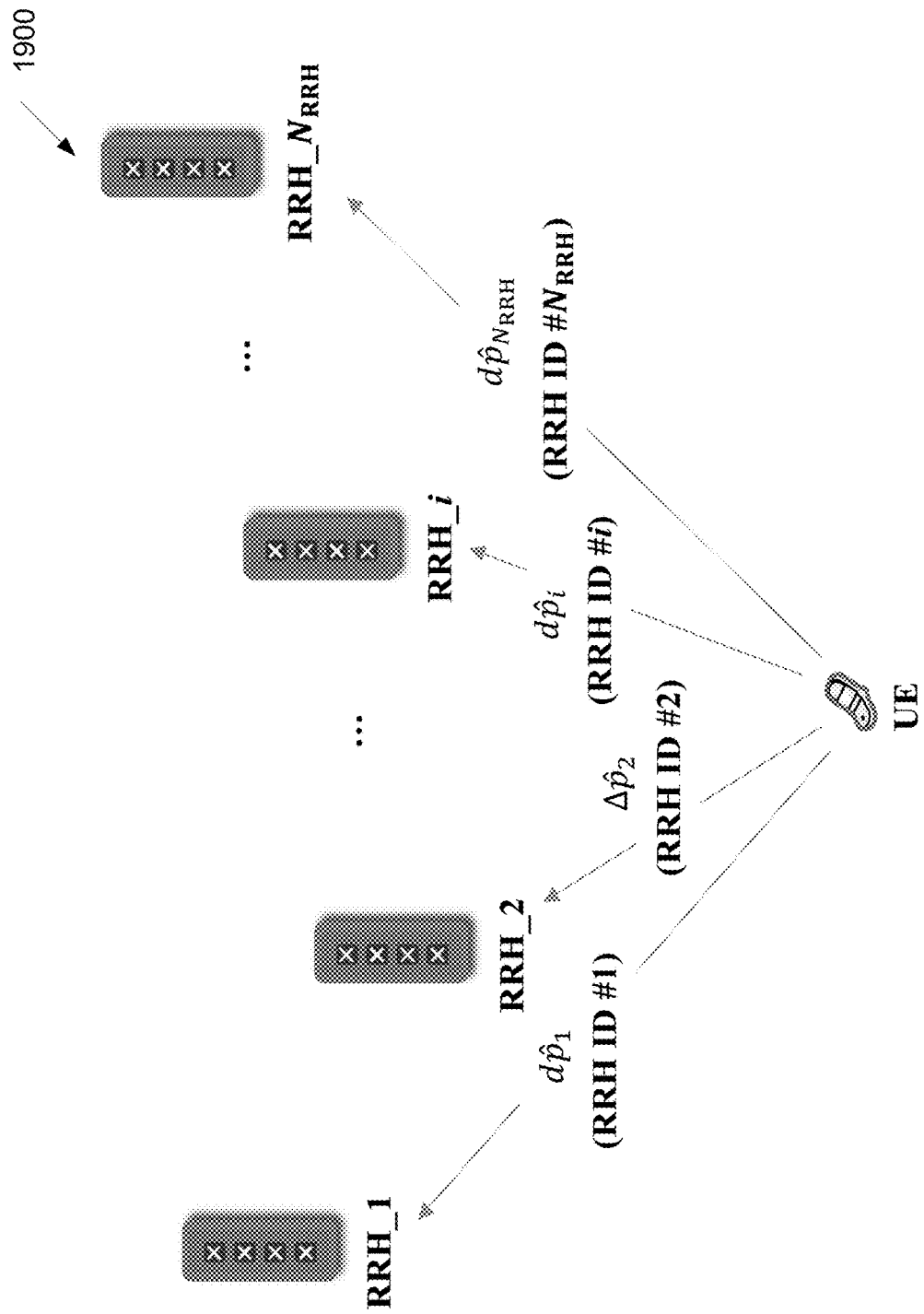
FIG. 19 illustrates an example of UE reporting RRH-specific differential array phase offset estimates according to embodiments of the present disclosure.

FIG. 19 illustrates an example of UE reporting RRH-specific differential array phase offset estimates 1900 according to embodiments of the present disclosure. An embodiment of the UE reporting the RRH-specific differential array phase offset estimates 1900 shown in FIG. 19 is for illustration only.

In FIG. 19, a conceptual example characterizing differential phase offset estimate reporting is depicted. As can be seen from FIG. 19, RRH_2 is regarded as the reference RRH, and the UE could report to the network the phase offset estimate $\Delta\hat{p}_2$ for RRH_2. For other RRHs in the RRH cluster such as RRH_i (i≠2), the UE could report to the network the differential phase offset estimates for them such as $d\hat{p}_i=\Delta\hat{p}_i-\Delta\hat{p}_2$ ($d\hat{p}_i=\Delta\hat{p}_2-\Delta\hat{p}_i$) or $d\hat{p}_i=|\Delta\hat{p}_i-\Delta\hat{p}_2|$ with a sign indicator for RRH_i. As discussed above, the UE could be indicated by the network the reference RRH(s) in the RRH cluster such as RRH_2 in FIG. 19.

The UE could also autonomously determine the reference phase offset estimate(s), and therefore the corresponding reference RRH(s) such as RRH_2 in FIG. 19. In this case, the UE would need to report to the network that RRH_2 is regarded as the reference RRH. Upon receiving the differential phase offset estimate(s) reported from the UE, the network could recover the exact phase offset estimate(s) for the corresponding RRH(s) from the differential phase offset estimate(s), and calibrate the phase value(s) for each RRH in the RRH cluster for the UE by compensating for the corresponding estimated phase offset value(s).

In one embodiment of Option-2.B, the UE could first scale the differential phase offset estimate(s) by a known factor. For instance, the UE could normalize the differential phase offset estimate for RRH_j by $\pi$, and obtain the scaled version as $d\hat{p}_j/\pi$. The UE could then report to the network the scaled version(s) of the differential phase offset estimate(s) for one or more RRHs in the RRH cluster through the designated resource(s) for the corresponding RRH(s). Similar to Option-2.A, the UE could report to the network the RRH ID along with the report of the scaled differential phase offset estimate for the RRH.

As discussed above, the UE could be indicated by the network the reference RRH(s) in the RRH cluster. The UE could also autonomously determine the reference phase offset estimate(s), and therefore the corresponding reference RRH(s). In this case, the UE would need to report to the network which RRH(s) (e.g., in form of the RRH ID(s)) is regarded as the reference RRH(s). Under certain settings, the UE may need to indicate to the network the applied scaling factor. Whether to report the exact or scaled differential phase offset estimate(s) could be predefined/preconfigured, and known to both the network and the UE.

Alternatively, the UE could be configured/indicated by the network whether to report the exact or scaled values of the differential phase offset estimate(s). Further, the UE could indicate to the network whether the reported differential phase offset estimates are the exact values or scaled by the known scaling factor.

In one embodiment of Option-2.C, the UE could be configured by the network one set of candidate values of differential phase offset (codebook for differential phase offset), denoted by $V=\{v_1, v_2, \ldots, v_L\}$. For a given differential phase offset estimate $d\hat{p}_j$ for RRH_j (e.g., $d\hat{p}_j=d\hat{p}_j-d\hat{p}_i$ ($d\hat{p}_j=d\hat{p}_i-d\hat{p}_j$) or $d\hat{p}_j=|d\hat{p}_j-d\hat{p}_i|$ assuming RRH_i as the reference RRH), the UE could select one candidate differential phase offset value from the set/codebook of candidate differential phase offset values that best characterizes the differential phase offset estimate.

For instance, the selected candidate differential phase offset value for RRH_j (denoted by $d\hat{q}_1$) could have the smallest/least Euclidean distance with the actual differential phase offset estimate for RRH_j ($d\hat{p}_j$) than the other candidate differential phase offset values in the set/codebook of all candidate differential phase offset values. The UE could report to the network the selected candidate differential phase offset value(s) for one or more RRHs in the RRH cluster.

Alternatively, the UE could report to the network the index(es) of the selected candidate differential phase offset value(s) for one or more RRHs in the RRH cluster in the set/codebook of all candidate differential phase offset values (denoted by differential POI(s)–dPOI(s)). If the codebook for differential phase offset V contains only absolute-valued codewords/entries, the UE could also report a sign indicator along with the report of the selected candidate differential phase offset value or the dPOI. The UE could also report to the network the RRH ID along with the report of the selected candidate differential phase offset value (or the dPOI) for the RRH.

As discussed above, the UE could be indicated by the network the reference RRH(s) in the RRH cluster. The UE could also autonomously determine the reference phase offset estimate(s), and therefore the corresponding reference RRH(s). In this case, the UE would need to report to the network which RRH(s) (e.g., in form of the RRH ID(s)) is regarded as the reference RRH(s).

In one embodiment of Option-2.D, the UE could first scale the differential phase offset estimate(s) by a known factor. For instance, the UE could normalize the differential phase offset estimate for RRH_j by $\pi$, and obtain the scaled version as $d\hat{p}_j/\pi$. The UE could be configured by the network a set of candidate values of scaled differential phase offset (codebook for scaled differential phase offset). For a scaled differential phase offset estimate, the UE could select one candidate scaled differential phase offset value from the set/codebook of candidate scaled differential phase offset values that best characterizes the scaled differential phase offset estimate.

For instance, the selected candidate scaled differential phase offset value could have the smallest/least Euclidean distance with the actual scaled differential phase offset estimate than the other candidate scaled differential phase offset values in the set/codebook of all candidates scaled differential phase offset values. The UE could report to the network the selected candidate scaled differential phase offset values for one or more RRHs in the RRH cluster.

Alternatively, the UE could report to the network the index(es) of the selected candidate scaled differential phase offset(s) for one or more RRHs in the RRH cluster in the set/codebook of all candidates scaled differential phase offset values. If the codebook for scaled differential phase offset contains only absolute-valued codewords/entries, the UE could also report a sign indicator along with the report of the selected candidate scaled differential phase offset value or the index of the selected candidate scaled differential phase offset value in the set/codebook of all candidates scaled differential phase offset values. Under certain settings, the UE may need to indicate to the network the applied scaling factor.

The UE could report to the network the selected candidate scaled differential phase offset value or its index in the codebook for scaled differential phase offset through the designated resource(s) for the corresponding RRH. The UE could also report to the network the RRH ID along with the report of the selected candidate scaled differential phase offset value or its index in the codebook for scaled differential phase offset for the corresponding RRH. As discussed above, the UE could be indicated by the network the reference RRH(s) in the RRH cluster. The UE could also autonomously determine the reference phase offset estimate (s), and therefore the corresponding reference RRH(s). In this case, the UE would need to report to the network which RRH(s) (e.g., in form of the RRH ID(s)) is regarded as the reference RRH(s).

In one embodiment of Option-2.E, the UE could report to the network a vector of differential phase offset estimates, with each entry in the vector corresponding to a RRH in the RRH cluster. For instance, assuming that $M_{RRH}$ RRHs in the RRH cluster are associated with the differential phase offset estimates ("differential" RRHs), the UE could form the vector of differential phase offset estimates as $$d p=\left[d \hat{p}_{1}, d \hat{p}_{2}, \ldots, d \hat{p}_{j}, \ldots, d \hat{p}_{M_{RRH}}\right].$$

The association rule(s)/mapping relationship(s) between the entries in the vector of differential phase offset estimates and the "differential" RRHs could be predefined, and known to both the network and the UE. For example, the first entry in the vector corresponds to the RRH with the lowest RRH ID among the "differential" RRHs (or the first RRH in the list of "differential" RRHs configured to the UE), the second entry in the vector corresponds to the RRH with the second lowest RRH ID among the "differential" RRHs (or the second RRH in the list of "differential" RRHs configured to the UE), and so on, and the last entry in the vector corresponds to the RRH with the highest RRH ID among the "differential" RRHs (or the last RRH in the list of "differential" RRHs configured to the UE).

Note that other association rule(s)/mapping relationship(s) between the entries in the vector of differential phase offset estimates and the "differential" RRHs in the RRH cluster are also possible.

Alternatively, the UE could be indicated by the network the explicit association rule(s)/mapping relationship(s) between the entries in the vector of differential phase offset estimates and the "differential" RRHs in the RRH cluster. Further, the UE could autonomously determine how the entries in the vector of differential phase offset estimates would map to the "differential" RRHs in the RRH cluster, and indicate to the network their determined association rule(s)/mapping relationship(s) between the entries in the vector of differential phase offset estimates and the "differential" RRHs in the RRH cluster.

The vector of differential phase offset estimates could be in other forms as well such as: (1) a vector of scaled differential phase offset estimates (e.g., scaled by 1/$\pi$) (similar to those obtained under Option-2.B), with each entry in the vector corresponding to a RRH in the RRH cluster; (2) a vector of selected candidate differential phase offset estimates from a codebook for differential phase offset (similar to those obtained under Option-2.C), with each entry in the vector corresponding to a RRH in the RRH cluster; (3) a vector of indices of the selected candidate differential phase offset estimates in the codebook for differential phase offset (similar to those obtained under Option-2.C), with each entry in the vector corresponding to a RRH in the RRH cluster; (4) a vector of selected candidate scaled differential phase offset estimates from a codebook for scaled differential phase offset (similar to those obtained under Option-2.D), with each entry in the vector corresponding to a RRH in the RRH cluster; and/or (5) a vector of indices of the selected candidate scaled differential phase offset estimates in the codebook for scaled differential phase offset (similar to those obtained under Option-2.D), with each entry in the vector corresponding to a RRH in the RRH cluster.

The UE could report to the network the vector of differential phase offset estimates to one or more RRHs in the RRH cluster through their designated resource(s) configured/indicated to the UE. As discussed above, the UE could be indicated by the network the reference RRH(s) in the RRH cluster. The UE could also autonomously determine the reference phase offset estimate(s), and therefore the corresponding reference RRH(s). In this case, the UE would need to report to the network which RRH(s) (e.g., in form of the RRH ID(s)) is regarded as the reference RRH(s).

The UE could report to the network the differential phase offset estimate(s) for one or more RRHs in the RRH cluster following the strategies provided under Option-2.A, Option-2.B, Option-2.C, Option-2.D, and/or Option-2.E. Further, the UE could report to the network the phase offset estimate(s) for one or more reference RRHs in the RRH cluster following the strategies discussed under Option-2.1, Option-2.2, Option-2.3, Option-2.4, and/or Option-2.5. Hence, there are many combinations of different reporting methods to report the exact/differential phase offset estimates.

For instance, the UE could report to the network the exact phase offset estimate(s) for the reference RRH(s) in the RRH cluster following Option-2.2, while report to the network the differential phase offset estimate(s) for the "differential" RRH(s) in the RRH cluster following Option-2.A. The UE could be indicated by the network to follow one or more combinations of the reporting methods to report to the network the exact/differential phase offset estimate(s).

In the above described design options, the UE would report to the network the (exact/differential) phase offset estimates for all the RRHs in the RRH cluster for the UE. The UE could report to the network the (exact/differential) phase offset estimates for a subset of RRHs in the RRH cluster for the UE. The UE could be indicated by the network the subset of RRHs through higher layer RRC signaling, MAC-CE activation command (e.g., by activating the subset of RRHs from a list/pool of all RRHs in the RRH cluster) or DCI signaling. Alternatively, the UE could autonomously determine the subset of RRHs in the RRH cluster, and indicate to the network the selected RRHs (e.g., in form of their RRH IDs).

The UE could be configured by the network one or more thresholds for determining (exact/differential) phase offset estimate report(s).

In one example, for Option-2.1, Option-2.3, and Option-2.5, the UE could be configured by the network a threshold (denoted by Th_3) for comparing with the (exact) phase offset estimate. For instance, if a phase offset estimate is below the threshold, the UE would not report to the network the phase offset estimate for the corresponding RRH or report to the network a zero phase offset estimate for the corresponding RRH.

In one example, for Option-2.2, Option-2.4, and Option-2.5, the UE could be configured by the network a threshold (denoted by Th_4) for comparing with the scaled phase offset estimate. For instance, if a scaled phase offset estimate is below the threshold, the UE would not report to the network the scaled phase offset estimate for the corresponding RRH or report to the network a zero scaled phase offset estimate for the corresponding RRH.

In one example, for Option-2.A, Option-2.C, and Option-2.E, the UE could be configured by the network a threshold (denoted by Th_C) for comparing with the differential phase offset estimate. For instance, if a differential phase offset estimate is below the threshold, the UE would not report to the network the differential phase offset estimate for the corresponding RRH or report to the network a zero differential phase offset estimate for the corresponding RRH.

In one example, for Option-2.B, Option-2.D, and Option-2.E, the UE could be configured by the network a threshold (denoted by Th_D) for comparing with the scaled differential phase offset estimate. For instance, if a scaled differential phase offset estimate is below the threshold, the UE would not report to the network the scaled differential phase offset estimate for the corresponding RRH or report to the network a zero scaled differential phase offset estimate for the corresponding RRH.

Alternatively, the UE could autonomously determine/select the thresholds such as Th_3, Th_4, Th_C and/or Th_D discussed above for determining the (exact/differential) phase offset estimate report(s). The UE could send to the network their determined threshold(s).

The UE could transmit at least one SRS resource to the network, and the network could use it to estimate the phase offset for each RRH in the RRH cluster for the UE. The RS configuration could include at least one downlink RS resource for phase offset estimation/tracking and at least one SRS resource, wherein the RS configuration can be joint (via one configuration) or separate (via two separate configurations). The phase offset values for all RRHs in the RRH cluster for the UE could be acquired at the network based on both SRS measurements and the phase offset estimate reporting from the UE.

In the above descried design options, the UE could be configured/indicated by the network to measure the RRH-specific RSs for phase offset estimation/tracking. Alternatively, the UE could be configured/indicated by the network to measure a common RS transmitted from one or more RRHs in the RRH cluster for phase offset estimation/tracking. If the UE could be indicated by the network the association rule(s)/mapping relationship(s) between different time/frequency components of the common RS and the RRHs, the UE could still generate different phase offset estimates (differential phase offset estimates) for different RRHs, and report them to the network following Option-2.1, Option-2.2, Option-2.3, Option-2.4, and/or Option-2.5 (Option-2.A, Option-2.B, Option-2.C, Option-2.D, and/or Option-2.E).

If the UE is not indicated by the network any association rule(s)/mapping relationship(s) between the common RS and the RRHs, the UE could only report to the network all phase offset estimates obtained from measuring the common RS for phase offset estimation/tracking. In this case, the phase offset estimates could contain both inter-RRH phase offset estimates and intra-RRH phase offset estimates. The UE could be configured by the network to measure the RRH-specific RSs or the common RS for phase offset estimation/tracking in a periodic/semi-persistent manner, and report to the network the corresponding measurement results.

Alternatively, the UE could be triggered by the network to measure the RRH-specific RSs or the common RS for phase offset estimation/tracking in an aperiodic manner. The UE could also trigger the network to send the RRH-specific RSs or the common RS for phase offset estimation/tracking.

The above discussed array phase offset measurement, estimation, reporting and compensation methods can be applied/extended to measuring, estimating, reporting and compensating array amplitude offset in a distributed RRH system by considering the array amplitude offset instead of the array phase offset.

In the present disclosure, an RRH/array impairment reporting is defined, which could correspond to: (1) phase offset reporting only; (2) amplitude offset reporting only; and/or (3) both phase offset and amplitude offset reporting.

For instance, if the RRH/array impairment reporting corresponds to the phase offset reporting only, the RRH/array impairment reporting could include at least one of the following cases: (1) Case-a: One or more phase offset estimates for one or more RRHs in the RRH cluster; (2) Case-b: One or more scaled phase offset estimates for one or more RRHs in the RRH cluster; (3) Case-c: One or more selected candidate phase offset estimates from a codebook for phase offset for one or more RRHs in the RRH cluster; (4) Case-d: One or more indices of the selected candidate phase offset estimates in the codebook for phase offset for one or more RRHs in the RRH cluster; (5) Case-e: One or more selected candidate scaled phase offset estimates from a codebook for scaled phase offset for one or more RRHs in the RRH cluster; (6) Case-f: One or more indices of the selected candidate scaled phase offset estimates in the codebook for scaled phase offset for one or more RRHs in the RRH cluster; (7) Case-g: One or more differential phase offset estimates for one or more RRHs in the RRH cluster; (8) Case-h: One or more scaled differential phase offset estimates for one or more RRHs in the RRH cluster; (9) Case-i: One or more selected candidate differential phase offset estimates from a codebook for differential phase offset for one or more RRHs in the RRH cluster; (10) Case-j: One or more indices of the selected candidate differential phase offset estimates in the codebook for differential phase offset for one or more RRHs in the RRH cluster; (11) Case-k: One or more selected candidate scaled differential phase offset estimates from a codebook for scaled differential phase offset for one or more RRHs in the RRH cluster; and/or (12) Case-l: One or more indices of the selected candidate scaled differential phase offset estimates in the codebook for scaled differential phase offset for one or more RRHs in the RRH cluster.

Case-a to Case-l can be extended to: (1) the RRH/array impairment reporting corresponds to the amplitude offset reporting only, and (2) the RRH/array impairment reporting corresponds to both amplitude offset reporting and phase offset reporting. Further, the RRH/array impairment reporting can be multiplexed only with a WB CSI report, where the CSI report is periodic or semi-persistent. The RRH/array impairment reporting can be reported only via PUCCH. Alternatively, the RRH/array impairment reporting can be reported only when rank 1 is reported via RI, but the max allowed rank value can be more than 1.

A UE is configured with the RRH/array impairment reporting that can be transmitted, for example, as part of the CSI report (hence multiplexed with other CSI parameters), and/or by multiplexing it with HARQ-ACK transmission and/or Scheduling Request (SR). In one example, the RRH/array impairment reporting can be transmitted via SR if it's payload (number of bits) is less or equal to B1 (e.g., B1=1). In one example, the RRH/array impairment reporting can be transmitted via HARQ-ACK if it's payload (number of bits) is less or equal to B1 (e.g., B1=1). In one example, the RRH/array impairment reporting can be transmitted via SR or HARQ-ACK if the number of RRHs=2 (i.e., number of RRH/array impairment reporting is 1).

When multiplexed with other CSI parameters, at least one of the following examples can be used.

In one example, the RRH/array impairment reporting is via a separate (new) CSI parameter, e.g., API (array parameter indicator).

In one example, the RRH/array impairment reporting is joint with an existing CSI parameter (p), and the parameter (p) when reported indicates both a value for the CSI existing parameter and the RRH/array impairment reporting. At least one of the following examples can be used for the existing CSI parameter (p). In such example: (1) the parameter (p) is a rank indicator (RI). When reported, RI indicates both a value for the rank and the RRH/array impairment reporting; (2) the parameter (p) is a CSI-RS resource indicator (CRI). When reported, CRI indicates both a CSI-RS resource and the RRH/array impairment reporting; (3) the parameter (p) is a layer indicator (LI). When reported, LI indicates both a layer and the RRH/array impairment reporting; (4) the parameter (p) is a precoding matrix indicator (PMI) for a 2 port CSI-RS resource. When reported, PMI indicates both a precoding matrix and the RRH/array impairment reporting; (5) the parameter (p) is a first precoding matrix indicator (PMI1) for a X>2 port CSI-RS resource. When reported, PMI1 indicates both first components of a precoding matrix and the RRH/array impairment reporting; (6) the parameter (p) is a second precoding matrix indicator (PMI2) for a X>2 port CSI-RS resource. When reported, PMI2 indicates both second components of a precoding matrix and the RRH/array impairment reporting; (7) the parameter (p) is a channel quality indicator (CQI). When reported, CQI indicates both a CQI value and RRH/array impairment reporting; (8) the parameter (p) is a layer 1 RSRP (L1-RSRP). When reported, L1-RSRP indicates both a RSRP value and the RRH/array impairment reporting; and/or (9) the parameter (p) is a layer 1 SINR (L1-SINR). When reported, L1-SINR indicates both a SINR value and the RRH/array impairment reporting.

In one example, the RRH/array impairment reporting is using reserved or unused code points of an existing CSI parameter (p) to indicate the RRH/array impairment reporting. At least one of the following examples can be used for the existing CSI parameter (p). In such example: (1) the parameter (p) is a rank indicator (RI); (2) the parameter (p) is a CSI-RS resource indicator (CRI); (3) the parameter (p) is a layer indicator (LI); (4) the parameter (p) is a precoding matrix indicator (PMI) for a 2 port CSI-RS resource; (5) the parameter (p) is a first precoding matrix indicator (PMI1) for a X>2 port CSI-RS resource; (6) the parameter (p) is a second precoding matrix indicator (PMI2) for a X>2 port CSI-RS resource; (7) the parameter (p) is a channel quality indicator (CQI); (8) the parameter (p) is a layer 1 RSRP (L1-RSRP); and/or (9) the parameter (p) is a layer 1 SINR (L1-SINR).

In one example, the usage of an existing CSI parameter (p) can be configured (e.g., RRC) as either as a CSI parameter or as a parameter for the RRH/array impairment reporting. A code point of the parameter (p) indicates the CSI parameter of the RRH/array impairment reporting depending on the configured usage.

The RRH/array impairment reporting can be multiplexed with a periodic or semi-persistent (P/SP) CSI with wideband (WB) reporting. For such WB CSI reporting, the CSI payload (number of bits) can be fixed regardless of the value of the reported CSI parameters such as RI (although the CSI payload can vary for different rank values). In order to ensure fixed CSI payload, a number of zero-padding bits can be appended with the CSI bits (as illustrated in FIG. 13).

At least one of the following examples can be used for multiplexing the RRH/array impairment reporting with the WB CSI.

In one example, a portion or all of the zero padding bits appended in the WB CSI report is used to report the RRH/array impairment reporting. The least significant bits (LSBs) of the zero padding bits can be used for the RRH/ array impairment reporting. Or the most significant bits (MSBs) of the zero padding bits can be used for the RRH/array impairment reporting.

In one example, the RRH/array impairment reporting is multiplexed with the WB CSI parameters, wherein the multiplexing method is according to one of the examples described above.

The RRH/array impairment reporting can be multiplexed with an aperiodic (AP) CSI with subband (SB) reporting. For such SB reporting, the CSI can be partitioned into two parts, CSI part 1 and CSI part 2. The CSI part 1 includes RI and CQI (for the first codeword), and is multiplexed with UCI part 1. The CSI report includes LI, PMI, and CQI (for the second codeword when rank >4 is reported), and is multiplexed with UCI part 2. Here, UCI part 1 and UCI part 2 are parts of a two-part UCI (as illustrated in FIG. 14).

At least one of the following examples can be used for multiplexing the RRH/array impairment reporting with the SB CSI.

In one example, the RRH/array impairment reporting is multiplexed with a CSI parameter in CSI part 1. For example, the RRH/array impairment reporting is multiplexed with CQI (for the first code word) or RI, wherein the multiplexing method is according to one of the examples described above.

In one example, the RRH/array impairment reporting is multiplexed with a CSI parameter in CSI part 2. For example, the RRH/array impairment reporting is multiplexed with CQI (for the second code word when rank >4 is reported) or PMI or LI, wherein the multiplexing method is according to one of the examples described above.

In one example, the CSI part 2 is partitioned into three groups G0, G1, and G2 (as in Rel. 15/16 SB CSI reporting) and the UE reports either G0 or (G0, G1) or (G0, G1, G2) depending on the resource allocation for the CSI reporting and the total CSI part 2 payload (as described in UCI omission in Rel. 15/16 NR specification). In such example: (1) the RRH/array impairment reporting is multiplexed with a CSI parameter in G0, wherein the multiplexing method is according to one of the examples described above; (2) the RRH/array impairment reporting is multiplexed with a CSI parameter in G0 if only G0 is transmitted (reported) in UCI part 2 (i.e. G1 and G2 are omitted or not reported); the RRH/array impairment reporting is multiplexed with a CSI parameter in G1 if only (G0, G1) is transmitted (reported) in UCI part 2 (i.e. G2 is omitted or not reported); and the RRH/array impairment reporting is multiplexed with a CSI parameter in G2 if (G0, G1, G2) is transmitted (reported) in UCI part 2.

In addition to the frequency quality reporting and the RRH/array impairment reporting discussed in this disclosure, the UE could also be configured/indicated by the network to measure the receive timing differences (e.g., time alignment error between different RRHs in the RRH cluster and/or propagation delay/average delay/delay spread differences between different RRHs in the RRH cluster and the UE) and/or different Doppler effects such as different Doppler shifts/Doppler spreads experienced by the UE with respect to different RRHs in the RRH cluster, and report to the network the corresponding measurement results.

The measurement and reporting of the receive timing differences and/or the Doppler effect differences could follow the design options described in this disclosure with moderate modifications. In one example, the UE could be configured/indicated by the network to measure one or more of frequency offsets (phase shifts), array phase offsets, array amplitude offsets, receive timing differences, Doppler effect differences and etc. for one or more RRHs in the RRH cluster for the UE, and report to the network the corresponding measurement results such as frequency offset (phase shift) estimates, array phase offset estimates, array amplitude offset estimates, receive timing difference estimates and Doppler shift estimates.

The UE could autonomously determine to measure and report one or more of frequency offsets (phase shifts), array phase offsets, array amplitude offsets, receive timing differences, Doppler effect differences and etc. for one or more RRHs in the RRH cluster for the UE. In this case, the UE could indicate to the network their selected measurement metric(s) such as the frequency offset (phase shift), array phase offset, array amplitude offset, receive timing difference, Doppler effect difference and etc.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to receive a configuration for reporting, in a channel state information (CSI) report, an amplitude offset for a target entity; and
a processor operably coupled to the transceiver, the processor configured to:
measure one or more measurement reference signals (RSs) for determining the amplitude offset; and
determine, based on the measured one or more measurement RSs, the amplitude offset for the target entity,
wherein the transceiver is further configured to transmit, at least based on the configuration, the CSI report including an amplitude offset report associated with the determined amplitude offset, and
wherein the measurement RSs comprise channel state information reference signals (CSI-RSs), synchronization signal blocks (SSBs), or both CSI-RSs and SSBs.

2. The UE of claim 1, wherein:
the configuration includes time and frequency resource configurations in a CSI reporting setting for reporting the amplitude offset; and
the amplitude offset is configured as a report quantity in the CSI reporting setting in addition to a channel quality indicator (CQI), a precoding matrix indicator (PMI), a rank indicator (RI), and a layer indicator (LI).

3. The UE of claim 1, wherein:
the amplitude offset is between a first amplitude metric of a plurality of antenna elements at the target entity and a reference amplitude metric;
the configuration further indicates at least one of:
an entity identifier (ID) of the target entity;
the reference amplitude metric; and a threshold for use in determining the amplitude offset; and the entity ID of the target entity corresponds to at least one of: a physical cell ID (PCI), a CORESETPoolIndex value, a PCI index pointing to a PCI in a list of PCIs that are higher layer configured to the UE, a RS resource ID, a RS resource set ID, and a RS resource setting ID.

4. The UE of claim 1, wherein:
the amplitude offset is between a first amplitude metric of a plurality of antenna elements at the target entity and a reference amplitude metric;
the reference amplitude metric corresponds to a second amplitude metric of a plurality of antenna elements at a reference entity;
the configuration further includes an entity ID of the reference entity;
the entity ID of the reference entity corresponds to at least one of: a PCI, a CORESETPoolIndex value, a PCI index pointing to a PCI in a list of PCIs that are higher layer configured to the UE, a RS resource ID, a RS resource set ID, and a RS resource setting ID; and
the entity ID of the reference entity is different from the entity ID of the target entity.

5. The UE of claim 4, wherein:
the processor is further configured to determine the reference entity; and
the transceiver is further configured to transmit at least the entity ID of the reference entity.

6. The UE of claim 1, wherein:
a first set of the one or more measurement RSs are associated with a reference entity;
a second set of the one or more measurement RSs are associated with the target entity; and
the processor is configured to:
  measure the first or second sets of measurement RSs;
  determine, based on the measured first or second sets of measurement RSs, first or second amplitude metrics; and
  determine the amplitude offset based on the first or second amplitude metrics.

7. The UE of claim 1, wherein:
the amplitude offset report indicates at least one of:
  an amplitude metric of a reference entity;
  an amplitude metric of the target entity;
  an amplitude offset for the target entity; and
  a sign indicator for the amplitude offset,
and
the amplitude offset report is part of the CSI report, multiplexed with hybrid automatic repeat request acknowledgement (HARQ-ACK) information, or multiplexed with a scheduling request (SR).

8. The UE of claim 1, wherein:
the amplitude offset report is part of the CSI report;
one of:
  (i) the CSI report is a periodic or semi-persistent (P/SP) wideband (WB) CSI report and the amplitude offset report is multiplexed according to at least one of:
    the amplitude offset report is indicated by a portion or all of zero padding bits in the WB CSI report, and
    the amplitude offset report is multiplexed with one or more CSI parameters in the WB CSI report; or
  (ii) the CSI report is an aperiodic (AP) narrowband (NB) two-part CSI report and the amplitude offset report is multiplexed according to at least one of:
    the amplitude offset report is multiplexed with one or more CSI parameters including a channel quality indicator (CQI) and a rank indicator (RI) in a first part (part 1) of the NB CSI report, and
    the amplitude offset report is multiplexed with one or more CSI parameters including a CQI, a precoding matrix indicator (PMI), and a layer indicator (LI) in a second part (part 2) of the NB CSI report; and the amplitude offset report is multiplexed with one or more CSI parameters in the CSI report according to at least one of:
  the amplitude offset report is reported as a CSI parameter;
  the amplitude offset report is jointly reported with another CSI parameter; and
  the amplitude offset report is reported via a reserved or unused code point of the other CSI parameter, wherein the other CSI parameter corresponds to at least one of: a RI, a CSI-RS resource indicator (CRI), a LI, a PMI, a CQI, a layer 1 reference signal receive power (L1-RSRP) and a layer 1 signal to interference plus noise ratio (L1-SINR).

9. A base station (BS), comprising:
a processor configured to generate a configuration for reporting, in a channel state information (CSI) report, an amplitude offset for a target entity; and
a transceiver operably coupled to the processor, the transceiver configured to:
  transmit the configuration;
  transmit one or more measurement reference signals (RSs); and
  receive, at least based on the configuration, the CSI report including an amplitude offset report associated with the amplitude offset for the target entity, wherein the amplitude offset is based on the one or more measurement RSs,
wherein the measurement RSs comprise channel state information reference signals (CSI-RSs), synchronization signal blocks (SSBs), or both CSI-RSs and SSBs.

10. The BS of claim 9, wherein:
the configuration includes time and frequency resource configurations in a CSI reporting setting for reporting the amplitude offset; and
the amplitude offset is configured as a report quantity in the CSI reporting setting in addition to a channel quality indicator (CQI), a precoding matrix indicator (PMI), a rank indicator (RI), and a layer indicator (LI).

11. The BS of claim 9, wherein:
the amplitude offset is between a first amplitude metric of a plurality of antenna elements at the target entity and a reference amplitude metric;
the configuration further indicates at least one of:
  an entity identifier (ID) of the target entity;
  the reference amplitude metric;
  and
  a threshold for use in determining the amplitude offset; and
the entity ID of the target entity corresponds to at least one of: a physical cell ID (PCI), a CORESETPoolIndex value, a PCI index pointing to a PCI in a list of PCIs that are higher layer configured, a RS resource ID, a RS resource set ID, and a RS resource setting ID.

12. The BS of claim 9, wherein:
the amplitude offset is between a first amplitude metric of a plurality of antenna elements at the target entity and a reference amplitude metric;

the reference amplitude metric corresponds to a second amplitude metric of a plurality of antenna elements at a reference entity;

the configuration further includes an entity ID of the reference entity;

the entity ID of the reference entity corresponds to at least one of: a PCI, a CORESETPoolIndex value, a PCI index pointing to a PCI in a list of PCIs that are higher layer configured, a RS resource ID, a RS resource set ID, and a RS resource setting ID; and the entity ID of the reference entity is different from the entity ID of the target entity.

13. The BS of claim 12, wherein the transceiver is further configured to receive at least the entity ID of the reference entity.

14. The BS of claim 9, wherein:

the one or more measurement RSs are associated with a reference entity or are associated with the target entity; and the amplitude offset is based on amplitude metrics associated with the one or more measurement RSs.

15. The BS of claim 9, wherein:

the amplitude offset report indicates at least one of:
- an amplitude metric of a reference entity;
- an amplitude metric of the target entity;
- an amplitude offset for the target entity; and
- a sign indicator for the amplitude offset, and the amplitude offset report is part of the CSI report, multiplexed with hybrid automatic repeat request acknowledgement (HARQ-ACK) information, or multiplexed with a scheduling request (SR).

16. The BS of claim 9, wherein:

the amplitude offset report is part of and multiplexed in the CSI report;

one of:
  (i) the CSI report is a periodic or semi-persistent (P/SP) wideband (WB) CSI report and the amplitude offset report is multiplexed according to at least one of:
    the amplitude offset report is indicated by a portion or all of zero padding bits in the WB CSI report, and
    the amplitude offset report is multiplexed with one or more CSI parameters in the WB CSI report; or
  (ii) the CSI report is an aperiodic (AP) narrowband (NB) two-part CSI report and the amplitude offset report is multiplexed according to at least one of:
    the amplitude offset report is multiplexed with one or more CSI parameters including a channel quality indicator (CQI) and a rank indicator (RI) in a first part (part 1) Of the NB CSI report, and
    the amplitude offset report is multiplexed with one or more CSI parameters including a CQI, a precoding matrix indicator (PMI), and a layer indicator (LI) in a second part (part 2) of the NB CSI report; and the amplitude offset report is multiplexed with one or more CSI parameters in the CSI report according to at least one of:

the amplitude offset report is reported as a CSI parameter;

the amplitude offset report is jointly reported with another CSI parameter; and the amplitude offset report is reported via a reserved or unused code point of the other CSI parameter, wherein the other CSI parameter corresponds to at least one of: a RI, a CSI-RS resource indicator (CRI), a LI, a PMI, a CQI, a layer 1 reference signal receive power (L1-RSRP) and a layer 1 signal to interference plus noise ratio (L1-SINR).

17. A method for operating a user equipment (UE), the method comprising:

receiving a configuration for reporting, in a channel state information (CSI) report, an amplitude offset for a target entity;

measuring one or more measurement reference signals (RSs) for determining the amplitude offset;

determining, based on the measured one or more measurement RSs, the amplitude offset for the target entity; and transmitting, at least based on the configuration, the CSI report including an amplitude offset report associated with the determined amplitude offset, wherein the measurement RSs comprise channel state information reference signals (CSI-RSs), synchronization signal blocks (SSBs), or both CSI-RSs and SSBs.

18. The method of claim 17, wherein:

the configuration includes time and frequency resource configurations in a CSI reporting setting for reporting the amplitude offset; and the amplitude offset is configured as a report quantity in the CSI reporting setting in addition to a channel quality indicator (CQI), a precoding matrix indicator (PMI), a rank indicator (RI), and a layer indicator (LI).

19. The method of claim 17, wherein:

the amplitude offset is between a first amplitude metric of a plurality of antenna elements at the target entity and a reference amplitude metric;

the configuration further indicates at least one of:
- an entity identifier (ID) of the target entity;
- the reference amplitude metric; and
- a threshold for use in determining the amplitude offset; and the entity ID of the target entity corresponds to at least one of: a physical cell ID (PCI), a CORESETPoolIndex value, a PCI index pointing to a PCI in a list of PCIs that are higher layer configured to the UE, a RS resource ID, a RS resource set ID, and a RS resource setting ID.

20. The method of claim 17, wherein:

the amplitude offset is between a first amplitude metric of a plurality of antenna elements at the target entity and a reference amplitude metric;

the reference amplitude metric corresponds to a second amplitude metric of a plurality of antenna elements at a reference entity;

the configuration further includes an entity ID of the reference entity;

the entity ID of the reference entity corresponds to at least one of: a PCI, a CORESETPoolIndex value, a PCI index pointing to a PCI in a list of PCIs that are higher layer configured to the UE, a RS resource ID, a RS resource set ID, and a RS resource setting ID; and the entity ID of the reference entity is different from the entity ID of the target entity.

* * * * *